United States Patent
Ly et al.

(10) Patent No.: US 11,601,930 B2
(45) Date of Patent: Mar. 7, 2023

(54) EARLY TERMINATION OF PUSCH TRANSMISSION

(71) Applicant: QUALCOMM Incorporated, San Diego, CA (US)

(72) Inventors: Hung Dinh Ly, San Diego, CA (US); Gokul Sridharan, Sunnyvale, CA (US); Yongjun Kwak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 17/165,860

(22) Filed: Feb. 2, 2021

(65) Prior Publication Data

US 2022/0248378 A1 Aug. 4, 2022

(51) Int. Cl.
*H04W 72/04* (2009.01)
*H04L 1/18* (2006.01)
(Continued)

(52) U.S. Cl.
CPC ......... *H04W 72/042* (2013.01); *H04L 1/1812* (2013.01); *H04L 5/0048* (2013.01); *H04L 5/14* (2013.01)

(58) Field of Classification Search
CPC ....... H04L 1/1812; H04L 5/0048; H04L 5/14; H04W 72/042
See application file for complete search history.

(56) References Cited

U.S. PATENT DOCUMENTS 11,129,188 B2 * 9/2021 Rico Alvarino ...... H04W 72/14
11,184,907 B2 * 11/2021 Bagheri ................ H04W 72/14
(Continued)

FOREIGN PATENT DOCUMENTS

CN   113475026 A * 10/2021 ........... H04L 1/1887
CN   114424661 A *  4/2022 ........... H04L 1/0004
(Continued)

OTHER PUBLICATIONS

International Search Report and Written Opinion dated May 2, 2022 from corresponding PCT Application No. PCT/US2022/070360.
(Continued)

*Primary Examiner* — Eric Nowlin
(74) *Attorney, Agent, or Firm* — Arent Fox, LLP

(57) ABSTRACT

Aspects are provided allowing a UE to perform early termination of repetitions of an ongoing PUSCH transmission in response to a DCI from a base station indicating whether a prior PUSCH transmission or repetition was successfully decoded. The UE obtains information configuring an uplink data transmission and a repetition of the uplink data transmission. The UE sends the uplink data transmission to a base station. The UE terminates the repetition of the uplink data transmission in response to reception of downlink information in a downlink control channel. Thus, UE power reduction and enhanced resource efficiency may be achieved. Moreover, the repetition is terminated after a time gap following a CORESET where the downlink control channel is received. As a result, a start time for terminating PUSCH repetitions may be configured to accommodate various timing considerations such as dynamic TDD, different numerologies between PDCCH and PUSCH, and multiple PUSCH processing capabilities.

26 Claims, 15 Drawing Sheets

(51) Int. Cl.
*H04L 5/00* (2006.01)
*H04L 5/14* (2006.01)
*H04L 1/1812* (2023.01)

(56) References Cited

U.S. PATENT DOCUMENTS

| | | | |
|---|---|---|---|
| 2020/0014572 A1* | 1/2020 | Wong | H04L 1/20 |
| 2020/0044793 A1* | 2/2020 | Sundararajan | H04L 5/0082 |
| 2020/0059320 A1* | 2/2020 | Kim | H04W 72/042 |
| 2020/0107356 A1* | 4/2020 | Rico Alvarino | H04W 80/08 |
| 2020/0146034 A1* | 5/2020 | Bagheri | H04L 1/08 |
| 2021/0218437 A1* | 7/2021 | Khoshnevisan | H04L 5/0012 |
| 2021/0227528 A1* | 7/2021 | Bang | H04W 72/0453 |
| 2022/0007412 A1* | 1/2022 | Rico Alvarino | H04L 1/1864 |
| 2022/0029733 A1* | 1/2022 | Ye | H04L 1/0007 |
| 2022/0039128 A1* | 2/2022 | Bagheri | H04L 1/1822 |
| 2022/0052779 A1* | 2/2022 | Ye | H04L 1/0004 |
| 2022/0104259 A1* | 3/2022 | Li | H04W 74/0816 |
| 2022/0123902 A1* | 4/2022 | Panteleev | H04L 5/0053 |
| 2022/0124757 A1* | 4/2022 | Yi | H04L 5/0048 |
| 2022/0150928 A1* | 5/2022 | Choi | H04W 48/10 |
| 2022/0191846 A1* | 6/2022 | Ren | H04L 5/0091 |
| 2022/0200748 A1* | 6/2022 | Yao | H04W 72/0453 |
| 2022/0271880 A1* | 8/2022 | Choi | H04L 1/189 |
| 2022/0312446 A1* | 9/2022 | Choi | H04W 72/1268 |

FOREIGN PATENT DOCUMENTS

| | | | | |
|---|---|---|---|---|
| CN | 114946128 A | * | 8/2022 | H04B 1/713 |
| EP | 4009706 A1 | * | 6/2022 | H04L 1/1671 |
| KR | 20220043143 A | * | 4/2022 | H04L 1/0004 |
| TW | 202116032 A | * | 4/2021 | H04L 1/0004 |
| WO | 2020/068919 A1 | | 4/2020 | |
| WO | WO-2020172613 A1 | * | 8/2020 | H04L 1/1887 |
| WO | WO-2021034063 A1 | * | 2/2021 | H04L 1/0004 |
| WO | WO-2021146751 A1 | * | 7/2021 | H04B 1/713 |
| WO | WO-2022024044 A1 | * | 2/2022 | |
| WO | WO-2022075828 A1 | * | 4/2022 | |

OTHER PUBLICATIONS

Ericsson et al: "MAC corrections for NR operating in shared spectrum channel access", 3GPP Draft; RP-202767, 3rd Generation Partnership Project (3GPP), Mobile Competence Centre ; 650, Route Des Lucioles ; F-06921 Sophia-Antipolis Cedex; France, vol. RAN WG2, No. Electronic meeting; Nov. 2, 2020-Nov. 13, 2020 Dec. 3, 2020 (Dec. 3, 2020), XP051964746, Retrieved from the Internet: URL:https://ftp.3gpp.org/3guintemnal/3GPP_Ultimate_CRPacks/RP-202767.zip38321_CR0966rl_(Rel-16)_R2-2010840—MAC corrections for NR-U.docx [retrieved on Dec. 3, 2020].

* cited by examiner

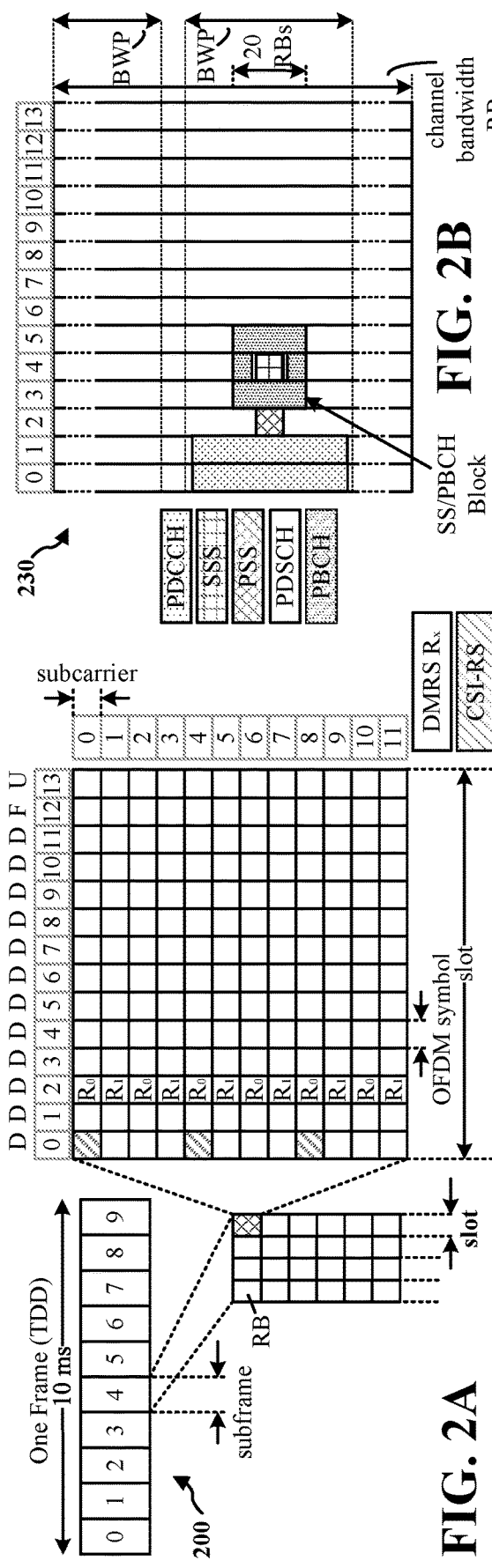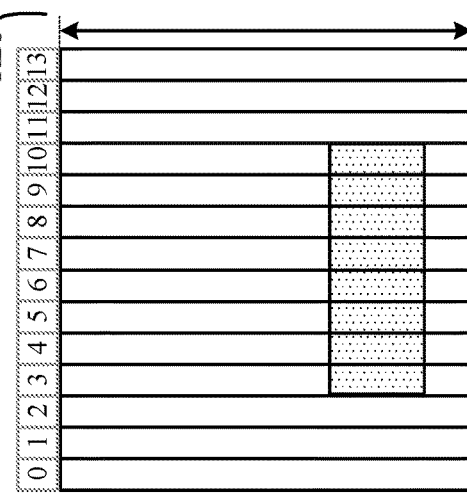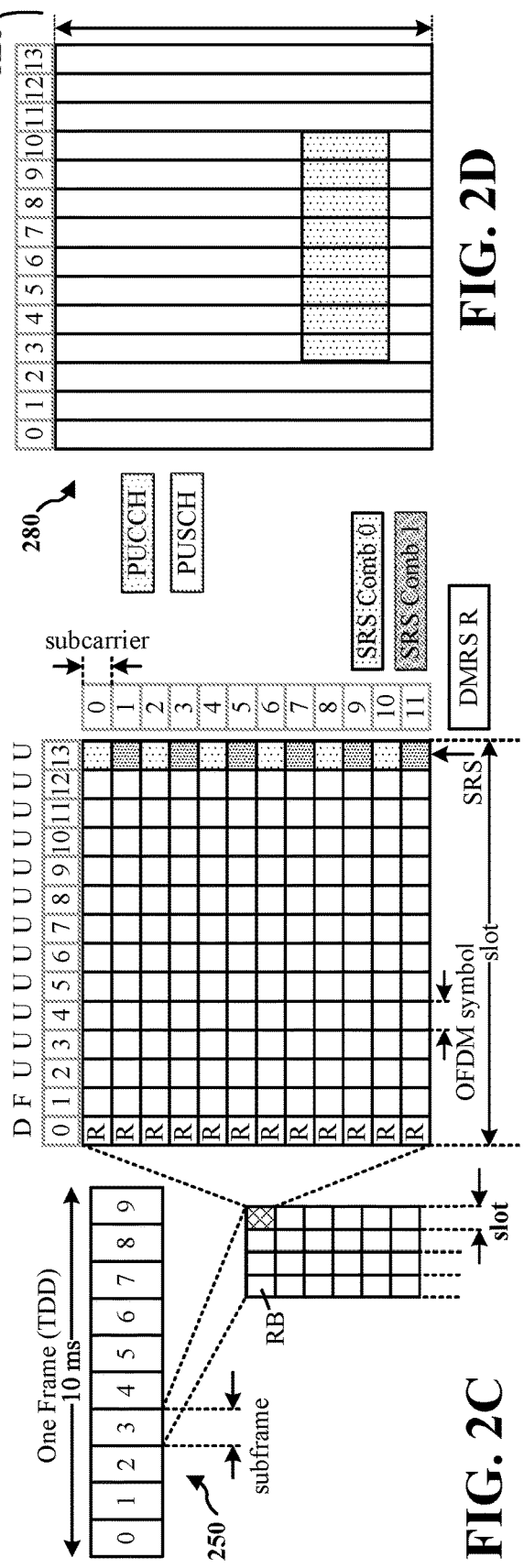
FIG. 2A  FIG. 2B  FIG. 2C  FIG. 2D

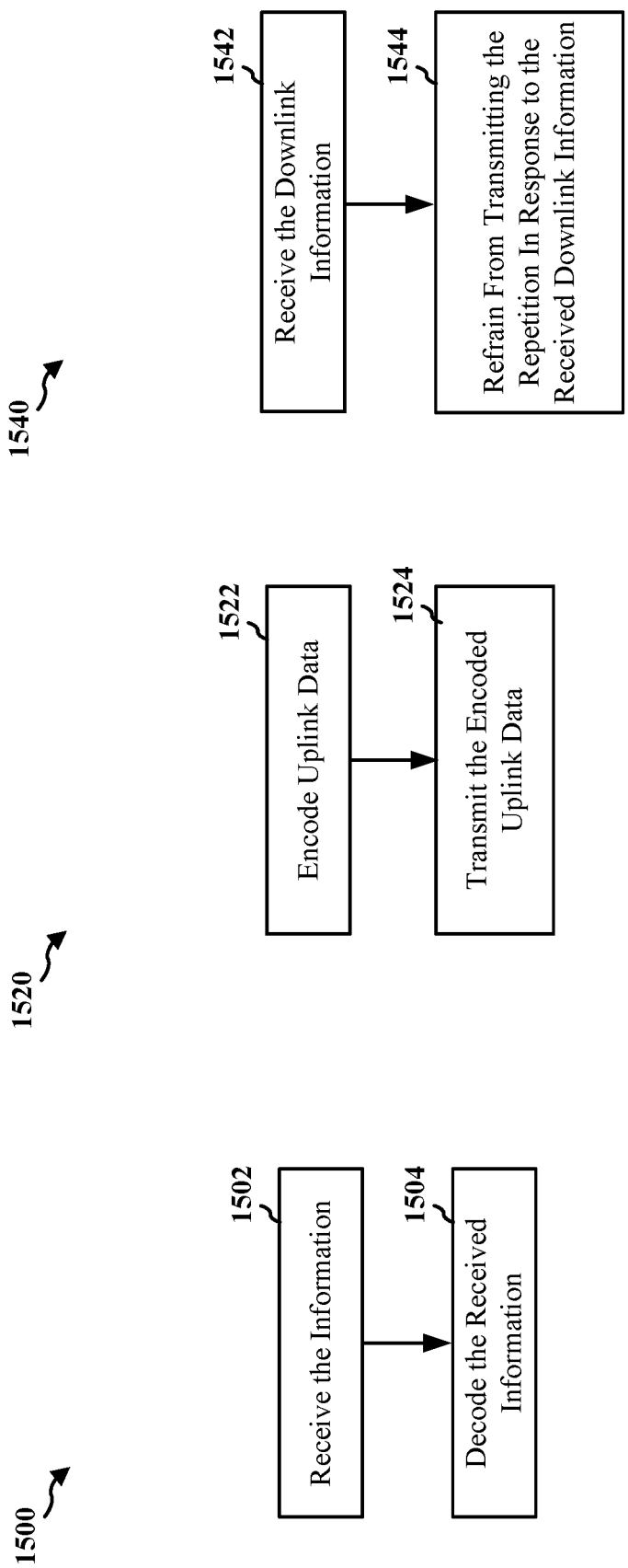

EARLY TERMINATION OF PUSCH TRANSMISSION

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE obtains information configuring an uplink data transmission and a repetition of the uplink data transmission. The UE sends the uplink data transmission to a base station, and the UE terminates the repetition of the uplink data transmission in response to reception of downlink information in a downlink control channel. The repetition is terminated after a time gap following a control resource set (CORESET) where the downlink control channel is received.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 15A-C are flowcharts of example processes performed by a UE.

DETAILED DESCRIPTION

Figure 1:
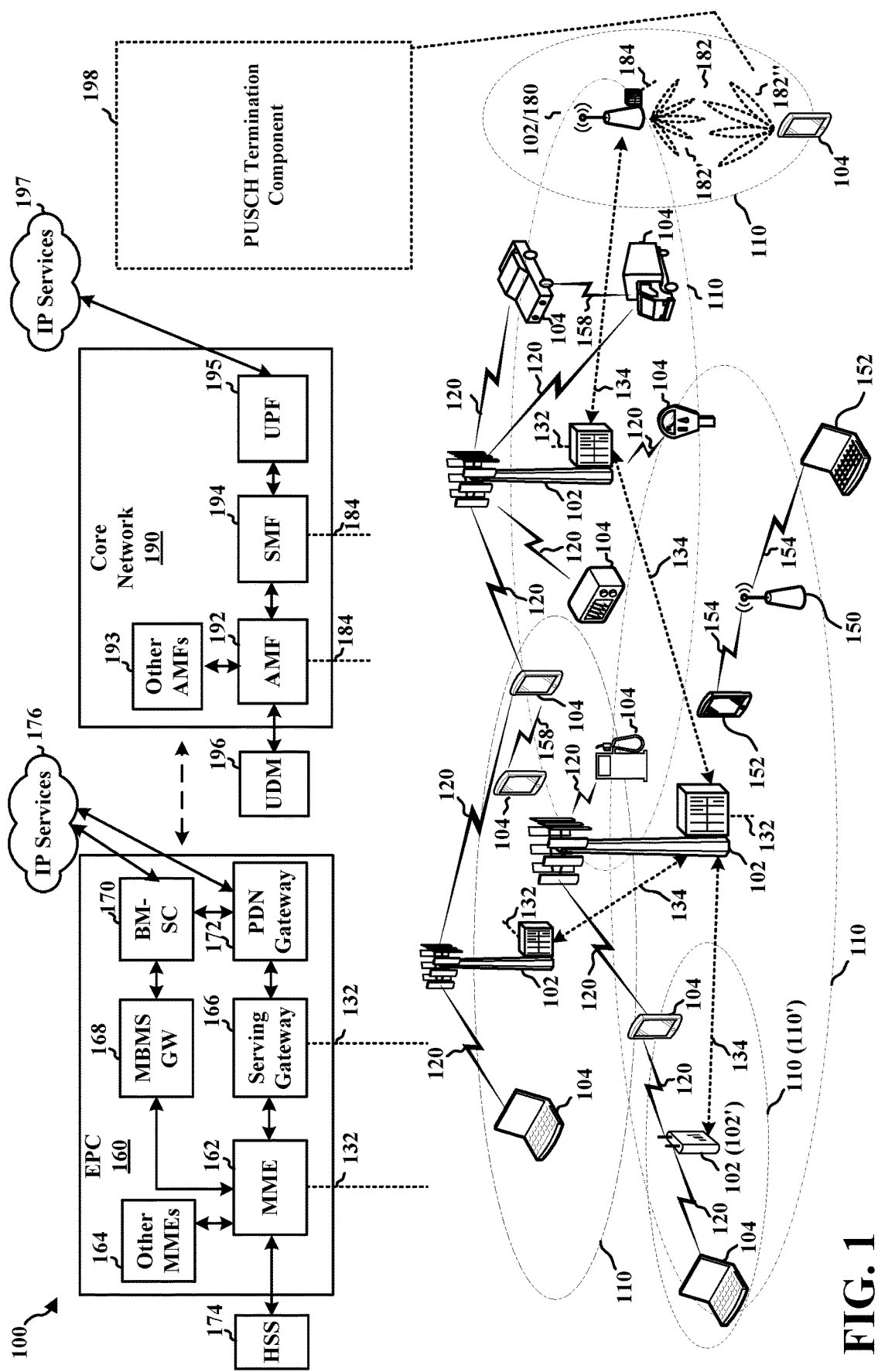
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

When a base station configures a UE to transmit uplink data in a physical uplink shared channel (PUSCH), the base station may indicate the UE to send repetitions of its uplink data for coverage enhancement and to improve data reliability. Typically, the UE may be configured to send up to sixteen repetitions of a PUSCH transmission in response to a dynamic grant or up to eight repetitions in response to a configured grant. However, the number of repetitions may be increased above sixteen, for example, to further extend PUSCH coverage for enhanced mobile broadband (eMBB)/voice over Internet Protocol (VoIP), to support low capability UEs with extended coverage, or in other cases. Therefore, the UE may send numerous repetitions of its uplink data in order for the base station to successfully decode the uplink data.

While in some cases, the base station may successfully decode the uplink data after receiving all configured repetitions (e.g., when the UE is located a significant distance away from the base station such as at a cell edge), in other cases the base station may successfully decode the data only after receiving some of the configured repetitions. For instance, even if the base station configures the UE to transmit eight PUSCH repetitions, the base station may successfully decode the data after receiving only four PUSCH repetitions (or some other number less than 8) if the UE is not at the cell edge or otherwise in a geometry with high signal quality.

Moreover, while asynchronous hybrid automatic repeat request (HARQ) acknowledgment (ACK) is supported in NR in response to downlink transmissions (e.g., HARQ-ACK from UE to base station), the base station does not conventionally provide HARQ-ACK feedback in response to PUSCH transmissions (e.g., HARQ-ACK from base station to UE). Instead, depending on whether the base station successfully decodes or fails to decode uplink data, the base station may provide downlink control information (DCI) to the UE indicating whether the UE is to retransmit the uplink data in a subsequent PUSCH transmission. In particular, if the base station fails to decode uplink data, the base station may provide DCI to the UE indicating the UE to retransmit the uplink data, while if the base station successfully decodes uplink data, the base station does not provide such DCI, and the UE assumes the data was successfully received after determining the base station has not provided such DCI within a certain period of time.

Thus, even if the base station has already decoded uplink data in a prior PUSCH transmission or repetition, the UE may not determine the base station has successfully decoded the data until the period of time for receiving the DCI has elapsed, and so the UE may continue to send unnecessary PUSCH repetitions in the interim. As a result, the UE may waste transmission power and PUSCH resources on inefficient repetitions. Therefore, it would be helpful to allow the UE to perform early termination of an ongoing PUSCH transmission (e.g., terminate inefficient repetitions) in order to save UE power and enhance resource efficiency.

Accordingly, aspects are provided for terminating repetitions of a PUSCH transmission. In a first example, the base station may provide a DCI in PDCCH that explicitly indicates successful decoding of a PUSCH transmission. The indication may be provided using configured bit values for various parameters of DCI. For instance, the DCI may have a DCI format 0-0 or 0-1 including a frequency domain resource assignment (FDRA) field or a MCS field set to all ones, and all remaining bits in one or more other parameters of the DCI (e.g., time domain resource assignment (TDRA), frequency hopping flag, etc.) set to zero. The UE may receive the PDCCH carrying the DCI in a control resource set (CORESET), and the DCI may indicate the UE to terminate subsequent repetitions of the PUSCH transmission after a time gap following the CORESET (e.g., no later than T symbols after a last symbol of the CORESET). In a second example, the base station may provide a DCI in PDCCH that implicitly indicates successful decoding of a first PUSCH transmission. For instance, the base station may provide a DCI to the UE scheduling a second PUSCH transmission in overlapping time resources with the first PUSCH transmission. The UE may receive the PDCCH carrying the DCI in a CORESET, and the DCI may indicate the UE to terminate subsequent repetitions of the first PUSCH transmission after a time gap following the CORESET (e.g., no later than T symbols after a last symbol of the CORESET). The DCI may also indicate the UE to transmit the second PUSCH transmission in an uplink slot after the time gap following the CORESET. In either the first or second example, the time gap (e.g., the value of T) may be a function of PDCCH subcarrier spacing (SCS) and PUSCH SCS, PUSCH processing capability, whether the first symbol of a PUSCH resource allocation is reserved for a demodulation reference signal (DMRS), and a PUSCH preparation time. Additionally, the time gap (T) may include an additional number of symbols Δ for UE processing margin (e.g. T=T+Δ), which duration may be a function of the PDCCH SCS and PUSCH SCS. For instance, the duration of the additional number of symbols Δ may be a function of the smaller SCS between the PDCCH SCS and PUSCH SCS.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6

GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a physical uplink shared channel (PUSCH) termination component 198 that is configured to obtain information configuring an uplink data transmission and a repetition of the uplink data transmission; send the uplink data transmission to a base station; and terminate the repetition of the uplink data transmission in response to reception of downlink information in a downlink control channel, where the repetition is terminated after a time gap following a CORESET where the downlink control channel is received.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
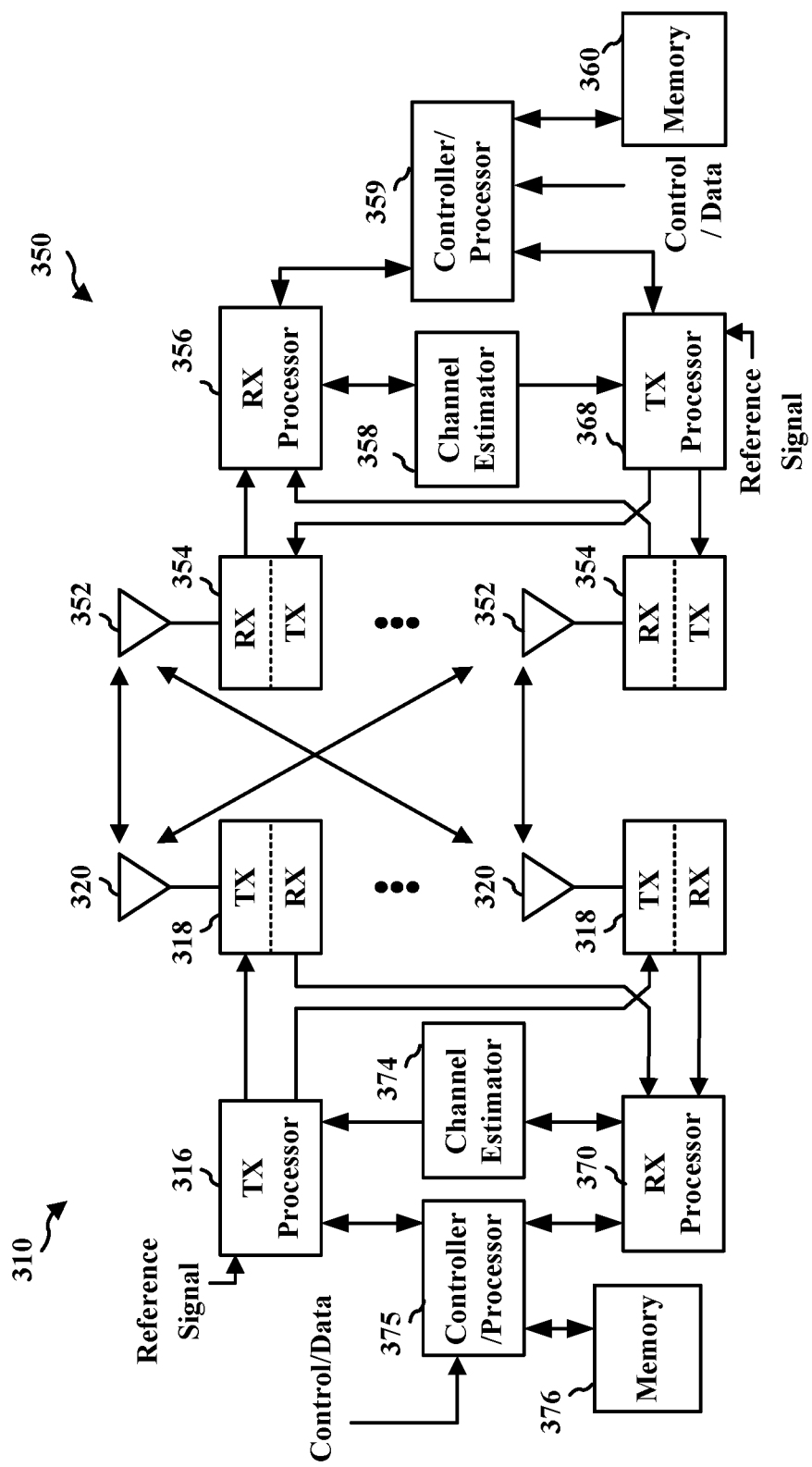
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with PUSCH termination component 198 of FIG. 1.

When a base station configures a UE to transmit uplink data in PUSCH, the base station may indicate the UE to send repetitions of its uplink data for coverage enhancement and to improve data reliability. For example, the base station may transmit a PUSCH configuration (e.g., pusch-Config or another name) via dedicated RRC signaling to the UE which may indicate a number of repetitions of uplink data which the UE may transmit on PUSCH in response to a dynamic grant (e.g., in a parameter pusch-AggregationFactor or another name). In another example, the base station may transmit a configured grant configuration to the UE (e.g., configuredGrantConfig or another name) which may indicate a number of repetitions of uplink data that the UE may transmit on PUSCH in response to a configured grant (e.g., in a parameter repK or another name). Typically, the UE may be configured to send up to sixteen repetitions of a PUSCH transmission in response to a dynamic grant or up to eight repetitions in response to a configured grant. However, the number of repetitions may be increased above sixteen, for example, to further extend PUSCH coverage for enhanced mobile broadband (eMBB)/voice over Internet Protocol (VoIP), to support low capability UEs with extended coverage, or in other cases. For instance, in rural or some urban areas, downlink channels typically include higher signal quality than uplink channels (e.g., by approximately 6-12 dB), and therefore PUSCH repetitions may serve to compensate for this degradation in signal quality.

Therefore, the UE may send numerous repetitions of its uplink data in order for the base station to successfully decode the uplink data. While in some cases, the base station may successfully decode the uplink data after receiving all configured repetitions (e.g., when the UE is located a significant distance away from the base station such as at a cell edge), in other cases the base station may successfully decode the data only after receiving some of the configured repetitions. For instance, even if the base station configures the UE to transmit eight PUSCH repetitions, the base station may successfully decode the data after receiving only four PUSCH repetitions (or some other number less than 8) if the UE is not at the cell edge or otherwise in a geometry with high signal quality.

However, while asynchronous hybrid automatic repeat request (HARD) acknowledgment (ACK) is supported in NR in response to downlink transmissions (e.g., HARQ-ACK from UE to base station), the base station does not conventionally provide HARQ-ACK feedback in response to PUSCH transmissions (e.g., HARQ-ACK from base station to UE). Instead, depending on whether the base station successfully decodes or fails to decode uplink data, the base station may provide downlink control information (DCI) to the UE indicating whether the UE is to retransmit the uplink data in a subsequent PUSCH transmission. For example, if the base station fails to decode uplink data, the base station may provide DCI to the UE indicating the UE to retransmit the uplink data, while if the base station successfully decodes uplink data, the base station does not provide such DCI, and the UE assumes the data was successfully received after determining the base station has not provided such DCI within a certain period of time. Thus, even if the base station has already decoded uplink data in a prior PUSCH transmission or repetition, the UE may not determine the base station has successfully decoded the data until the period of time for receiving the DCI has elapsed, and so the UE may continue to send unnecessary PUSCH repetitions in the interim. As a result, the UE may waste transmission power and PUSCH resources on inefficient repetitions. Therefore, it would be helpful to allow the UE to perform early termination of an ongoing PUSCH transmission (e.g., terminate inefficient repetitions) in order to save UE power and enhance resource efficiency.

In LTE enhanced machine type communication (eMTC), the UE may terminate ongoing uplink transmissions in full duplex (FD) frequency division duplex (FD-FDD) and time division duplex (TDD) deployments in response to DCI from the base station. For example, the base station may provide DCI to the UE in a MTC physical downlink control channel (MPDCCH), and the DCI may explicitly or implicitly indicate the base station has successfully decoded a prior uplink transmission. The UE may then terminate the ongoing PUSCH transmission in response to the DCI.

The indication may be explicit (serve as an effective HARQ-ACK) when the DCI includes one of two DCI formats including a certain configuration of bit values in specified DCI parameters. For instance, to explicitly acknowledge that the base station has successfully decoded the uplink transmission from the UE, the base station may provide a DCI to the UE having DCI format 6-0A including a resource block assignment field set to all ones and all remaining bits (except a flag format 6-0A/format 6-1A differentiation and DCI subframe repetition number) set to zero. Alternatively, the base station may provide a DCI to the UE having DCI format 6-0B including a modulation and coding scheme (MCS) field set to all ones and all remaining bits (except a flag format 6-0B/format 6-1B differentiation and DCI subframe repetition number) set to zero. On the other hand, the indication may be implicit when the base station schedules a new PUSCH transport block overlapping in time with the previously scheduled PUSCH transmission or repetitions. For instance, to implicitly acknowledge that the base station has successfully decoded the uplink transmission from the UE, the base station may provide a DCI to the UE scheduling a new PUSCH transport block in overlapping time resources.

When the UE receives in subframe N a DCI in MPDCCH, which explicitly indicates the base station has successfully decoded a prior uplink transmission using DCI formats 6-0A or 6-0B as described above, the UE may terminate or stop transmitting data on PUSCH no later than subframe N+k, where k is a number of subframes. For example, k may be 4 subframes for FDD deployments, or k may be a function of a subframe number (or slot number) and a TDD uplink/downlink configuration for TDD deployments (e.g., k=4, 5, 6, or 7). The UE may terminate the PUSCH transmission earlier than subframe N+k in response to early decoding of the DCI in MPDCCH. Similarly, when the UE receives in subframe M a DCI in MPDCCH, which implicitly indicates the base station has successfully decoded a prior uplink transmission by scheduling a new PUSCH transmission in overlapping resources, the UE may terminate or stop transmitting data on PUSCH no later than subframe M+k. The UE may terminate the PUSCH transmission earlier than subframe M+k, for example, in response to early decoding of the DCI in MPDCCH. Additionally, the UE may transmit the new PUSCH transmission in response to the DCI beginning in subframe M+k.

Figure 4:
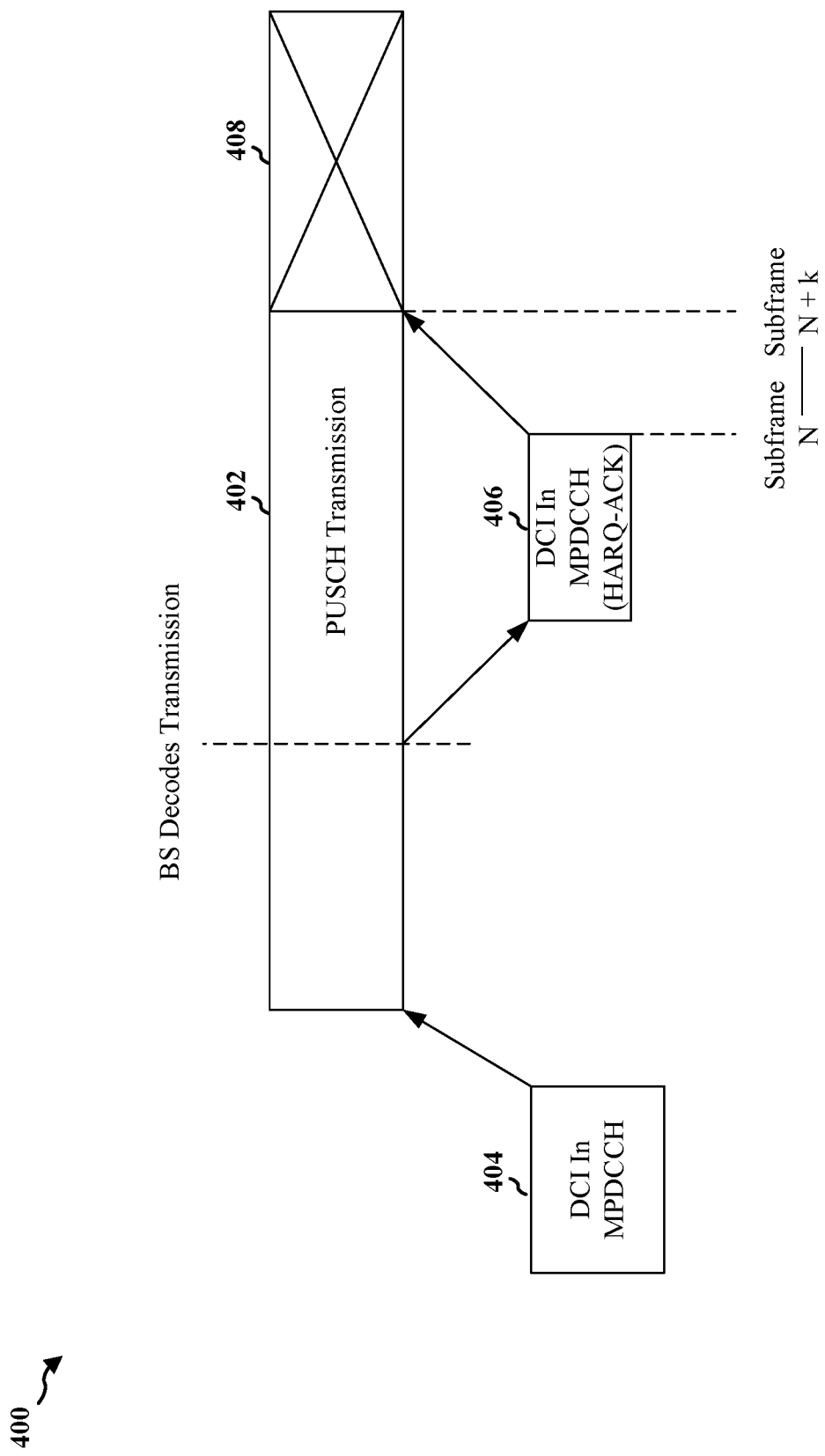
FIG. 4 is a diagram illustrating an example of a terminated uplink data transmission in response to downlink information explicitly indicating successful decoding of the transmission.

FIG. 4 illustrates an example 400 in which the UE terminates a PUSCH transmission 402 in response to a DCI explicitly indicating successful decoding of the PUSCH transmission. The base station initially provides DCI 404 in MPDCCH to the UE scheduling the PUSCH transmission, in response to which the UE begins to transmit its uplink data to the base station in PUSCH transmission 402. While the UE is transmitting its uplink data in one or more repetitions, the base station may successfully decode the PUSCH transmission. Moreover, the base station may determine that the UE does not have additional data to send in its transmission buffer, e.g., in response to a buffer status report from the UE or in some other manner. Therefore, the base station may provide DCI 406 to the UE explicitly indicating that the PUSCH transmission was successfully decoded. For example, DCI 406 may have a DCI format 6-0A or 6-0B with configured bit values as described above that does not schedule a new PUSCH transmission. The UE may then terminate its PUSCH transmission in response to DCI 406. For example, assuming the UE receives DCI 406 in subframe N, the UE may terminate the PUSCH transmission no later than subframe N+k. For instance, the UE may stop sending repetitions of its uplink data beginning at subframe N+k, as represented by terminated PUSCH transmission 408.

Figure 5:
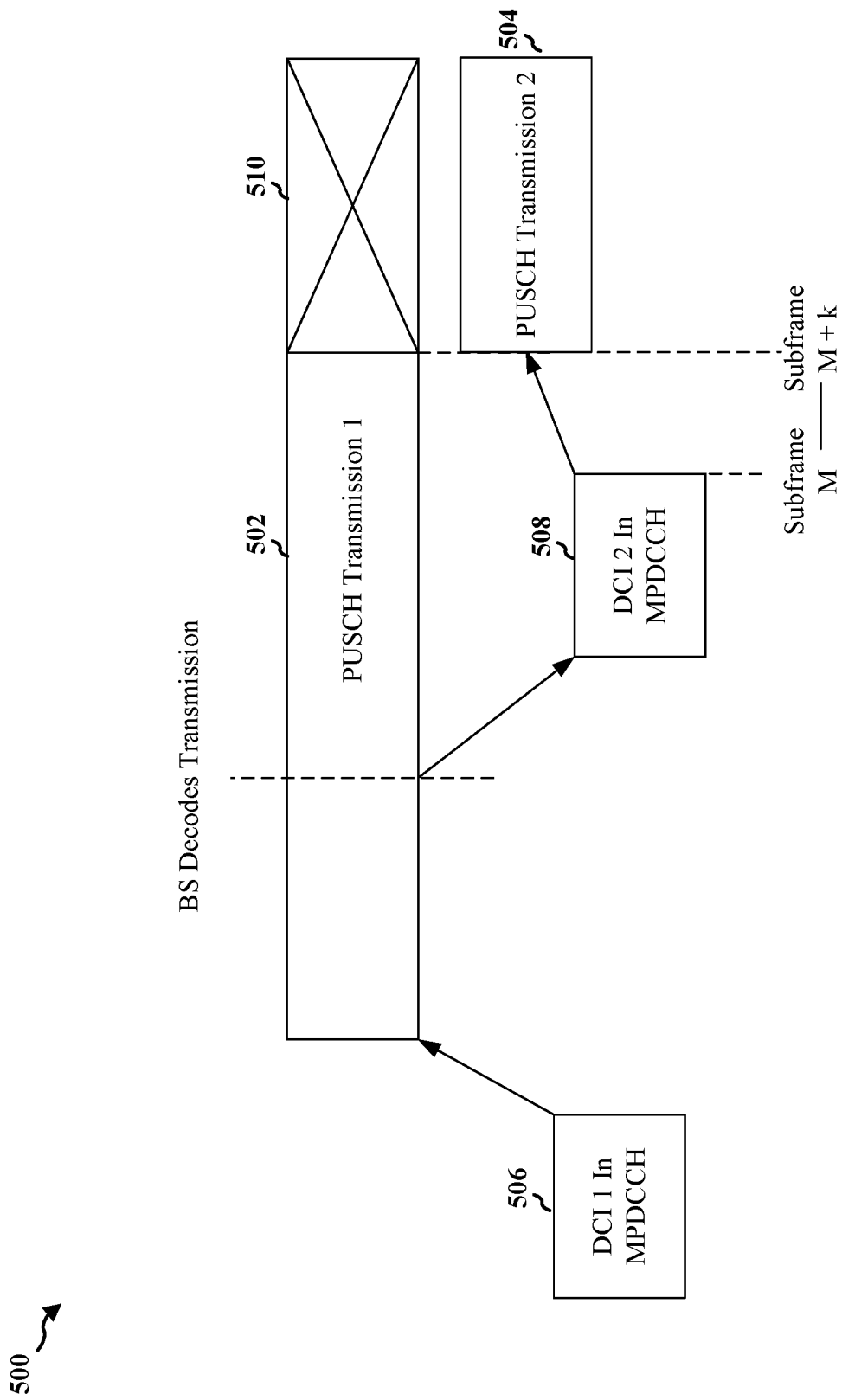
FIG. 5 is a diagram illustrating an example of a terminated, first uplink data transmission in response to downlink information implicitly indicating successful decoding of the first transmission and scheduling a second uplink data transmission.

Similarly, FIG. 5 illustrates an example 500 in which the UE terminates a first PUSCH transmission 502 in response to a DCI implicitly indicating successful decoding of the first PUSCH transmission and scheduling a second PUSCH transmission 504. The base station initially provides DCI 506 in MPDCCH to the UE scheduling the first PUSCH transmission, in response to which the UE begins to transmit its uplink data to the base station in first PUSCH transmission 502. While the UE is transmitting its uplink data in one or more repetitions, the base station may successfully decode the first PUSCH transmission. Moreover, the base station may determine that the UE has additional data to send in its transmission buffer, e.g., in response to a buffer status report from the UE or in some other manner. Therefore, the UE may provide DCI 508 to the UE implicitly indicating that the first PUSCH transmission was successfully decoded. For example, DCI 508 may schedule second PUSCH transmission 504 in overlapping time resources with first PUSCH transmission 502. The UE may then terminate its first PUSCH transmission and transmit its second PUSCH transmission in response to DCI 508. For example, assuming the UE receives DCI 508 in subframe M, the UE may terminate the first PUSCH transmission no later than subframe M+k and begin transmitting the second PUSCH transmission starting in subframe M+k. For instance, the UE may stop sending repetitions of its first uplink data beginning at subframe M+k, as represented by terminated PUSCH transmission 510, as well as start sending its second uplink data beginning at subframe M+k.

However, while LTE eMTC may support early termination of PUSCH transmissions based on explicit or implicit feedback as described above, the timelines associated with such terminated PUSCH transmissions (subframes N+k and M+k) may not be maintainable in NR. For example, NR supports dynamic TDD configurations, in which the base station may dynamically change the symbol or slot format (e.g., the arrangement of downlink (DL) and uplink (UL) symbols or slots in a subframe), in contrast to the static TDD configurations supported in LTE (e.g., seven TDD UL/DL configurations 0-6). Thus, attempts to terminate PUSCH transmissions k subframes after reception of DCI may fail due to conflicts with dynamic UL/DL configurations. Moreover, NR supports different numerologies between the PDCCH and PUSCH (e.g., the PDCCH and PUSCH may include different subcarrier spacing (SCS)), and thus different symbol durations between PDCCH and PUSCH, in contrast to LTE. Therefore, the dynamic values of k based on a slot number or TDD UL/DL configuration in TDD deployments, and the fixed value of k in FDD deployments, may not be suitable if the DCI and the terminated PUSCH transmission are associated with different SCS or symbol durations. Furthermore, NR supports multiple PUSCH processing capabilities for UEs, in contrast to LTE. For example, after receiving a PDCCH transmission, a UE with PUSCH processing capability 2 may begin sending a PUSCH transmission in approximately half the amount of time compared to a UE with PUSCH processing capability 1 (e.g., 5 symbols after receiving DCI for capability 2, as opposed to 10 symbols after receiving DCI for capability 1, assuming 15 kHz SCS). Thus, terminating PUSCH transmissions k subframes after reception of DCI may be inefficient if the UE has an advanced PUSCH processing capability.

Accordingly, aspects of the present disclosure provide a timeline for terminating PUSCH transmissions which accounts for such timing considerations between NR and LTE. In a first example, the base station may provide a DCI in PDCCH that explicitly indicates successful decoding of a PUSCH transmission. For instance, the DCI may have a DCI format 0-0 or 0-1 including a frequency domain resource assignment (FDRA) field or a MCS field set to all ones, and all remaining bits in one or more other parameters of the DCI (e.g., time domain resource assignment (TDRA), frequency hopping flag, etc.) set to zero. The UE may receive the PDCCH carrying the DCI in a control resource set (CORESET), and the DCI may indicate the UE to terminate subsequent repetitions of the PUSCH transmission after a time gap following the CORESET (e.g., no later than T symbols after a last symbol of the CORESET). In a second example, the base station may provide a DCI in PDCCH that implicitly indicates successful decoding of a first PUSCH transmission. For instance, the base station may provide a DCI to the UE scheduling a second PUSCH transmission in overlapping time resources with the first PUSCH transmission. The UE may receive the PDCCH carrying the DCI in a CORESET, and the DCI may indicate the UE to terminate subsequent repetitions of the first PUSCH transmission after a time gap following the CORESET (e.g., no later than T symbols after a last symbol of the CORESET). The DCI may also indicate the UE to transmit the second PUSCH transmission in an uplink slot after the time gap following the CORESET. In either the first or second example, the time gap (e.g., the value of T) may be a function of PDCCH SCS and PUSCH SCS, PUSCH processing capability, whether the first symbol of a PUSCH resource allocation is reserved for a demodulation reference signal (DMRS), and a PUSCH preparation time. Additionally, the time gap (T) may include an additional number of symbols Δ for UE processing margin (e.g. T=T+Δ), which duration may be a function of the PDCCH SCS and PUSCH SCS. For instance, the duration of the additional number of symbols Δ may be a function of the smaller SCS between the PDCCH SCS and PUSCH SCS.

Thus, termination of PUSCH transmissions based on a timeline accounting for the different timing considerations of NR may be achieved. For example, here, the termination of PUSCH repetitions is with respect to a CORESET symbol timing reference (a last symbol of a CORESET including DCI), rather than with respect to the DCI subframe timing reference of LTE (an end of a subframe including DCI). Since the CORESET symbol timing reference is more configurable than the DCI subframe timing reference (the base station may configure the last symbol of a CORESET to be any symbol of a slot, in contrast to the end of a subframe which is fixed), more flexibility in PUSCH termination starting times may be achieved. Moreover, since the base station may configure different SCS, a dynamic, CORESET symbol timing reference as opposed to a fixed, DCI subframe timing reference may better account for the different symbol or slot durations resulting from different SCS. Furthermore, as the time gap (T) may also be a function of SCS, PUSCH processing capabilities, or other timing configurations (e.g., DMRS), various PUSCH termination starting times may be obtained.

The time gap (T) may be a function of one or more of the following example parameters. In one example, T may be a function of a subcarrier spacing of the PDCCH carrying the DCI and a subcarrier spacing of the PUSCH. For example, T may be one value if the SCS of the DCI and the PUSCH transmission are both 15 kHz, T may be another value if the SCS of the DCI and the PUSCH transmission are both 30 kHz, T may be another value if the SCS of the DCI is 15 kHz and the SCS of the PUSCH transmission is 30 kHz, etc. Similarly, T may be a function of a subcarrier spacing of an active DL BWP over which the PDCCH is monitored and a subcarrier spacing of an active UL BWP over which the PUSCH is transmitted. For example, T may be one value if the SCS of the DL BWP carrying the DCI and the UL BWP carrying the PUSCH transmission are both 15 kHz, T may be another value if the SCS of the DL BWP and the UL BWP are both 30 kHz, T may be another value if the SCS of the DL ZWP is 15 kHz and the SCS of the UL BWP is 30 kHz, etc. In another example, T may be a function of a PUSCH processing capability of the UE. For example, T may be one value for UE PUSCH processing capability 1 and another value for UE PUSCH processing capability 2. In a further example, T may be a function of a configuration indicating whether a first symbol of a PUSCH allocation consists only of DMRS. For example, T may be one value if the base station configures the first symbol of a slot of the PUSCH transmission to include only DMRS, while T may be another value if the base station configures the first symbol of a slot of the PUSCH transmission to include only PUSCH data, or PUSCH data and DMRS. In an additional example, T may be a function of a UE PUSCH preparation time $T_{proc,2}$, where $T_{proc,2}$ is a function of PUSCH preparation time $N_2$, where $N_2$ is based on a numerology $\mu$ for UE processing capability 1, where $\mu$ corresponds to the one of $(\mu_{DL}, \mu_{UL})$ resulting with the largest $T_{proc,2}$ (the smaller value or SCS between $\mu_{DL}, \mu_{UL}$), where the $\mu_{DL}$ corresponds to the subcarrier spacing at with the PDCCH carrying the DCI scheduling the PUSCH was transmitted, and where $\mu_{UL}$ corresponds to the subcarrier spacing at which the PUSCH is to be transmitted. For example, the value of T may be different for different values of $N_2$.

In addition to being a function of one or more of the aforementioned example parameters, the time gap (T) may be increased for additional UE processing margin. For instance, an additional number of symbols ($\Delta$) may be added to T for low capability UEs with large PUSCH preparation times, or for UEs transmitting simultaneously to multiple base stations (e.g., a source base station and a target base station during a handover). In one example, the value of $\Delta$ may be fixed. For instance, $\Delta$ may be preconfigured to a value of 0, 1, 2 or some other number. In another example, the value of $\Delta$ may be indicated to the UE, e.g., within a PUSCH configuration. For instance, when the base station provides a PUSCH configuration to the UE (e.g., puschConfig), the PUSCH configuration may indicate a configured value of $\Delta$ (e.g., 0, 1, 2 or some other number of symbols). In a further example, the value of $\Delta$ may be dependent on UE capability. For instance, $\Delta$ may be one value if the UE is capable of PUSCH processing capability 2, while $\Delta$ may be another value if the UE is only capable of PUSCH processing capability 1. In either example, the duration of $\Delta$ may be a function of the SCS of the PDCCH carrying the DCI and the SCS of the PUSCH carrying the uplink transmission (e.g., the smaller SCS between PDCCH SCS and the PUSCH SCS). For instance, the total length in time of $\Delta$ may be one value if the smaller SCS is 15 kHz, the total length in time of $\Delta$ may be another value if the smaller SCS is 30 kHz, etc.

Figure 6:
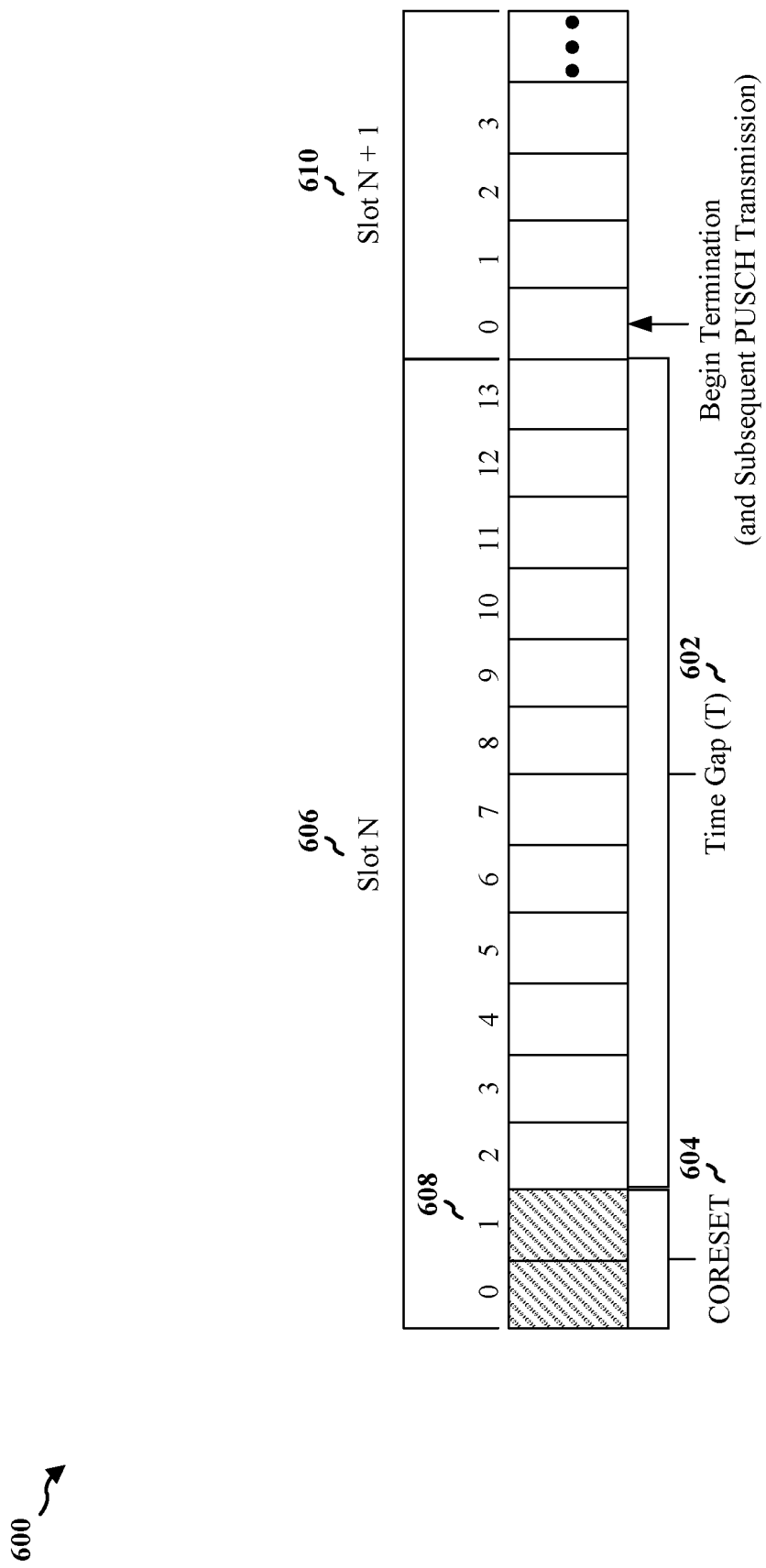
FIG. 6 is a diagram illustrating an example of a time gap following a CORESET where downlink information is received.

FIG. 6 illustrates an example 600 of a time gap 602 following a CORESET 604 where a PDCCH carrying DCI is received. The UE may receive CORESET 604 in a slot 606 (slot N). In the illustrated example, the time gap 602 is T=12 symbols, although in other examples the time gap may be a different number of symbols depending on SCS, UE capability, or other parameters as described above. Moreover, in this example, a last symbol 608 of CORESET 604 is the second symbol of slot 606 (symbol 1), although in other examples the last symbol 608 of CORESET 604 may be a different symbol in slot 606. Thus, in the illustrated example, the UE may terminate subsequent PUSCH repetitions of a prior PUSCH transmission no later than 12 symbols after the second symbol of slot 606. That is, the UE may stop transmitting repetitions of the PUSCH transmission at latest starting from symbol 0 of subsequent slot 610 (slot N+1). Similarly, if the DCI schedules a second PUSCH transmission, the UE may begin transmitting the second PUSCH transmission after the time gap 602. For example, the UE may begin transmitting the second PUSCH transmission starting from symbol 0 of subsequent slot 610 in response to the DCI.

Figure 7:
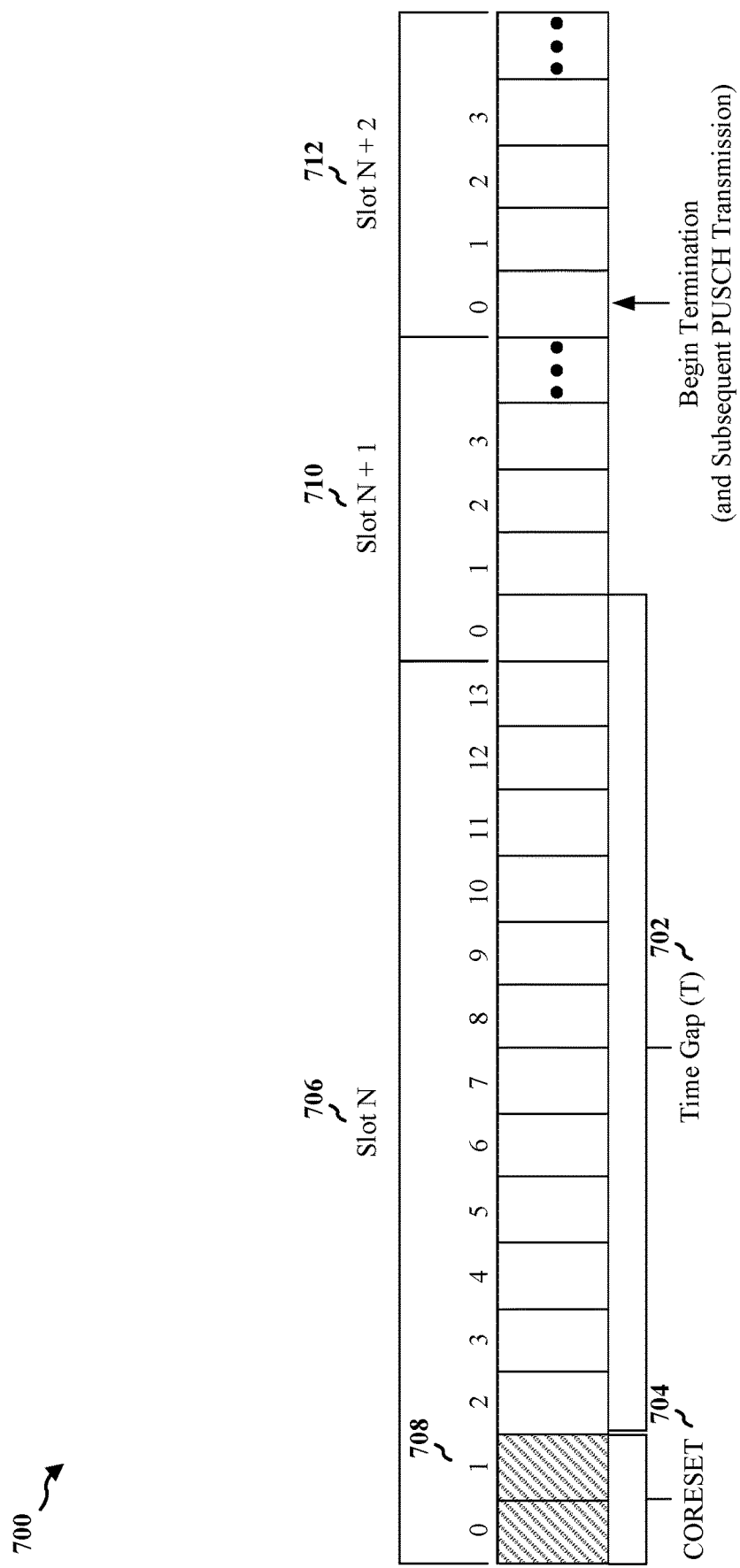
FIG. 7 is a diagram illustrating another example of a time gap following a CORESET where downlink information is received.

FIG. 7 illustrates another example 700 of a time gap 702 following a CORESET 704 where a PDCCH carrying DCI is received. Similar to the example of FIG. 6, the UE may receive CORESET 704 in a slot 706 (slot N). In the illustrated example, the time gap 702 is T=13 symbols, although in other examples the time gap may be a different number of symbols depending on SCS, UE capability, or other parameters as described above. Moreover, similar to the example of FIG. 6, here a last symbol 708 of CORESET 704 is the second symbol of slot 706 (symbol 1), although in other examples the last symbol 708 of CORESET 704 may be a different symbol in slot 706. However, unlike the example of FIG. 6, here the time gap 702 ends in the middle of a slot, in this case, next slot 710 (slot N+1). Thus, if the UE were to terminate subsequent PUSCH repetitions after the time gap following the CORESET, the termination would begin in the middle of a slot. To prevent such partial slot terminations, the UE may delay the termination to the beginning of a subsequent slot 712 (slot N+2), such as illustrated in FIG. 7. As a result, the UE may stop transmitting repetitions of the PUSCH transmission starting from symbol 0 of subsequent slot 712 (slot N+2), rather than starting from symbol 1 of next slot 710 (slot N+1). Similarly, if the DCI schedules a second PUSCH transmission, the UE may begin transmitting the second PUSCH transmission after the time gap 702 and additional time delay. For example, the UE may begin transmitting the second PUSCH transmission starting from symbol 0 of subsequent slot 712 in response to the DCI.

Figure 8:
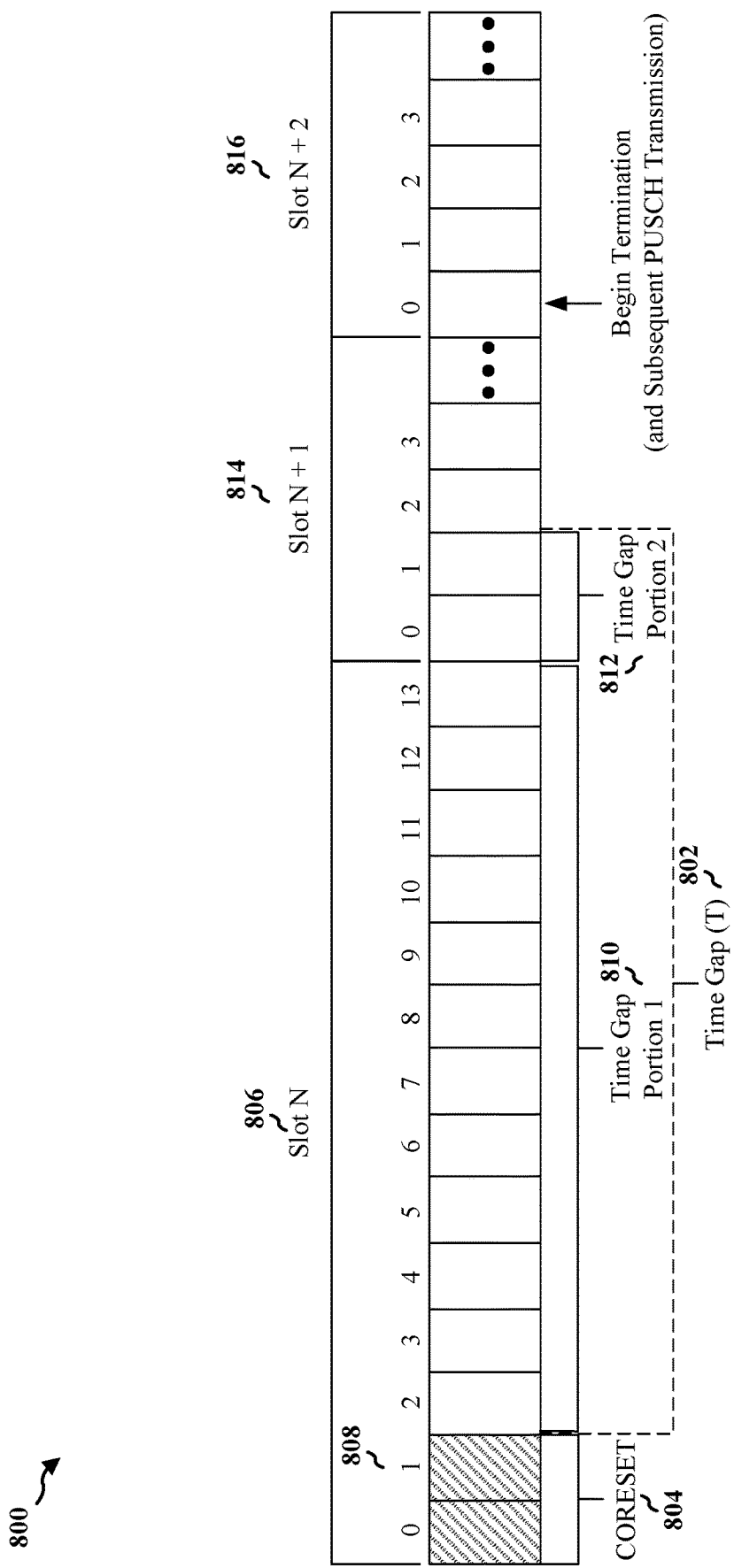
FIG. 8 is a diagram illustrating a further example of a time gap following a CORESET where downlink information is received.

FIG. 8 illustrates a further example 800 of a time gap 802 following a CORESET 804 where a PDCCH carrying DCI is received. Similar to the examples of FIGS. 6 and 7, the UE may receive CORESET 804 in a slot 806 (slot N). Also similar to the example of FIG. 6, here a last symbol 808 of CORESET 804 is the second symbol of slot 806 (symbol 1), although in other examples the last symbol 808 of CORESET 804 may be a different symbol in slot 806. However, unlike the examples of FIGS. 6 and 7, here the time gap 802 may include multiple portions, including a first time gap portion 810 (T symbols) and a second time gap portion 812 (A symbols) which the base station may separately configure. The first time gap portion 810 may correspond to the time gap 602, 702 of FIGS. 6 and 7. For instance, in the illustrated example, the first time gap portion 810 is T=12 symbols, although in other examples the first time gap portion may be a different number of symbols depending on SCS, UE capability, or other example parameters as described above. The second time gap portion 812 may be an additional number of symbols for additional UE processing margin. For instance, in the illustrated example, the second time gap portion 812 is Δ=2 symbols, although in other examples the second time gap portion may be a different number of symbols depending on PDCCH SCS and PUSCH SCS as described above. Additionally, similar to the example of FIG. 7, here the time gap 802 (including first time gap portion 810 and second time gap portion 812) ends in the middle of a slot, in this case, next slot 814 (slot N+1). Thus, if the UE were to terminate subsequent PUSCH repetitions after the time gap following the CORESET, the termination would begin in the middle of a slot. To prevent such partial slot terminations, the UE may delay the termination to the beginning of a subsequent slot 816 (slot N+2), such as illustrated in FIG. 8. As a result, the UE may stop transmitting repetitions of the PUSCH transmission starting from symbol 0 of subsequent slot 816 (slot N+2), rather than starting from symbol 1 of next slot 814 (slot N+1). Similarly, if the DCI schedules a second PUSCH transmission, the UE may begin transmitting the second PUSCH transmission after the time gap 802 and additional time delay. For example, the UE may begin transmitting the second PUSCH transmission starting from symbol 0 of subsequent slot 816 in response to the DCI.

Thus, the UE may terminate subsequent repetitions of a PUSCH transmission in response to a DCI which implicitly or explicitly indicates that the base station successfully decoded a prior PUSCH transmission. The DCI may implicitly indicate successful decoding when the DCI schedules a subsequent uplink transmission in overlapping resources of the repetitions of the prior uplink transmission. The DCI may explicitly indicate successful decoding (effectively serving as HARQ-ACK) when the DCI includes preconfigured bit values in its various DCI format parameters (e.g., DCI format 0_0 or 0_1). Such DCI serving as explicit HARQ-ACK does not schedule a subsequent uplink transmission.

Figure 9:
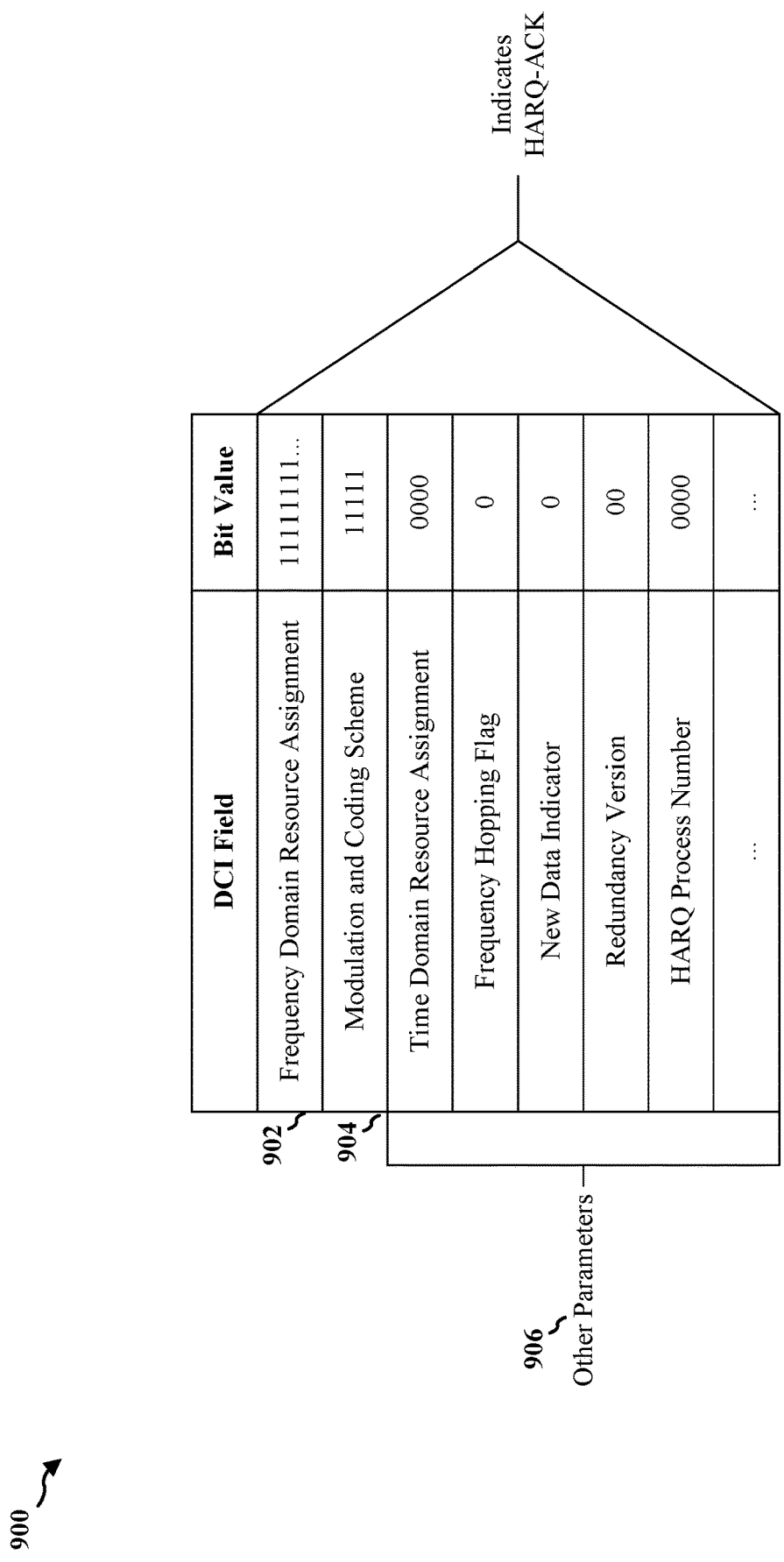
FIG. 9 is a diagram illustrating an example of downlink information serving as explicit acknowledgment feedback to an uplink data transmission.

FIG. 9 illustrates an example 900 of a DCI serving as explicit HARQ-ACK. While the illustrated example refers to DCI format 0_0, the DCI format may be different in other examples (e.g., DCI format 0_1). The DCI may various parameters, including a FDRA 902, a MCS 904, and other parameters 906 such as a TDRA, a frequency hopping flag, a new data indicator, a redundancy version, a HARQ process number, etc. To explicitly indicate that the base station has successfully decoded the PUSCH transmission, the base station may configure the bits of one or more DCI parameters according to one preconfigured bit value (e.g., a bit sequence) and the bits of one or more other DCI parameters according to a different preconfigured bit value (e.g., a different bit sequence). For instance, as illustrated in the example of FIG. 9, the base station may configure the FDRA 902 or the MCS 904 (or both) to include all one bits, and one or more of the other parameters 906 to include all zero bits. The base station may alternatively configure the FDRA or MCS (or both) to include all zero bits, and one or more of the other parameters to include all one bits. In other examples, the base station may configure the FDRA, MCS, or other parameters of the DCI with other bit sequences to indicate an explicit HARQ-ACK. Thus, when the UE receives the DCI, the UE may determine that the DCI serves to acknowledge a prior PUSCH transmission, and therefore that the UE may terminate subsequent repetitions of its prior PUSCH transmission.

Figure 10:
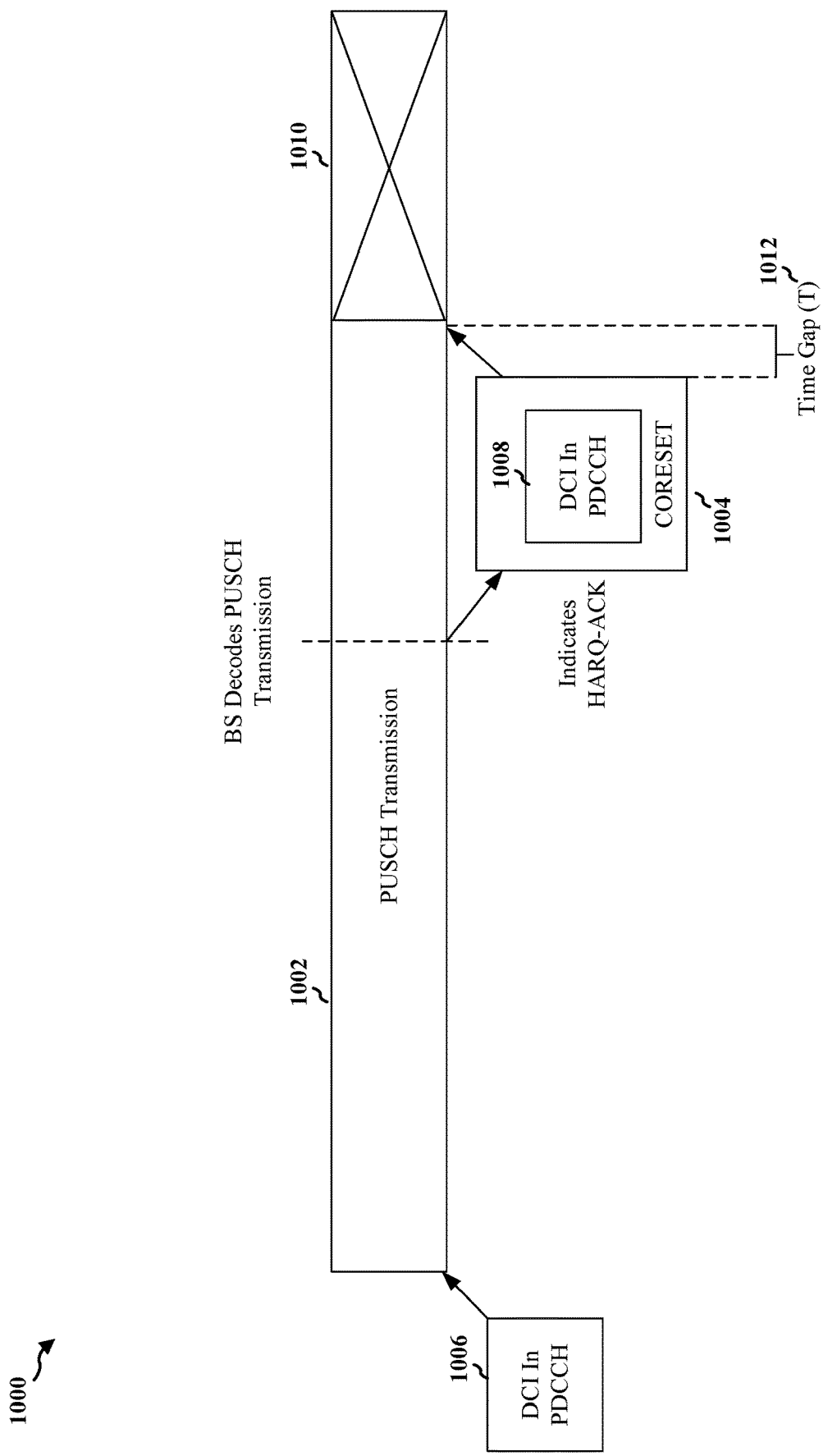
FIG. 10 is a diagram illustrating an example of a terminated uplink data transmission in response to downlink information in a CORESET explicitly indicating successful decoding of the transmission.

FIG. 10 illustrates an example 1000 in which the UE terminates a PUSCH transmission 1002 in response to a DCI in a CORESET 1004 (e.g., CORESET 604, 704, 804 of FIGS. 6-8) explicitly indicating successful decoding of the PUSCH transmission. The base station initially provides DCI 1006 in PDCCH to the UE scheduling the PUSCH transmission, in response to which the UE begins to transmit its uplink data to the base station in PUSCH transmission 1002. While the UE is transmitting its uplink data in one or more repetitions, the base station may successfully decode the PUSCH transmission. Moreover, the base station may determine that the UE does not have additional data to send in its transmission buffer, e.g., in response to a buffer status report from the UE or in some other manner. Therefore, the base station may provide DCI 1008 to the UE in CORESET 1004 explicitly indicating that the PUSCH transmission was successfully decoded. For example, DCI 1008 may have a DCI format 0-0 or 0-1 including a FDRA field or a MCS field set to all ones, and all remaining bits in one or more other parameters of the DCI (e.g., TDRA, frequency hopping flag, etc.) set to zero, as described above with respect to FIG. 9. In response to receiving DCI 1008, the UE may terminate its PUSCH transmission, as represented by terminated PUSCH transmission 1010, after a time gap 1012 (e.g., time gap 602, 702, 802) following the CORESET 1004 including DCI 1008.

Figure 11:
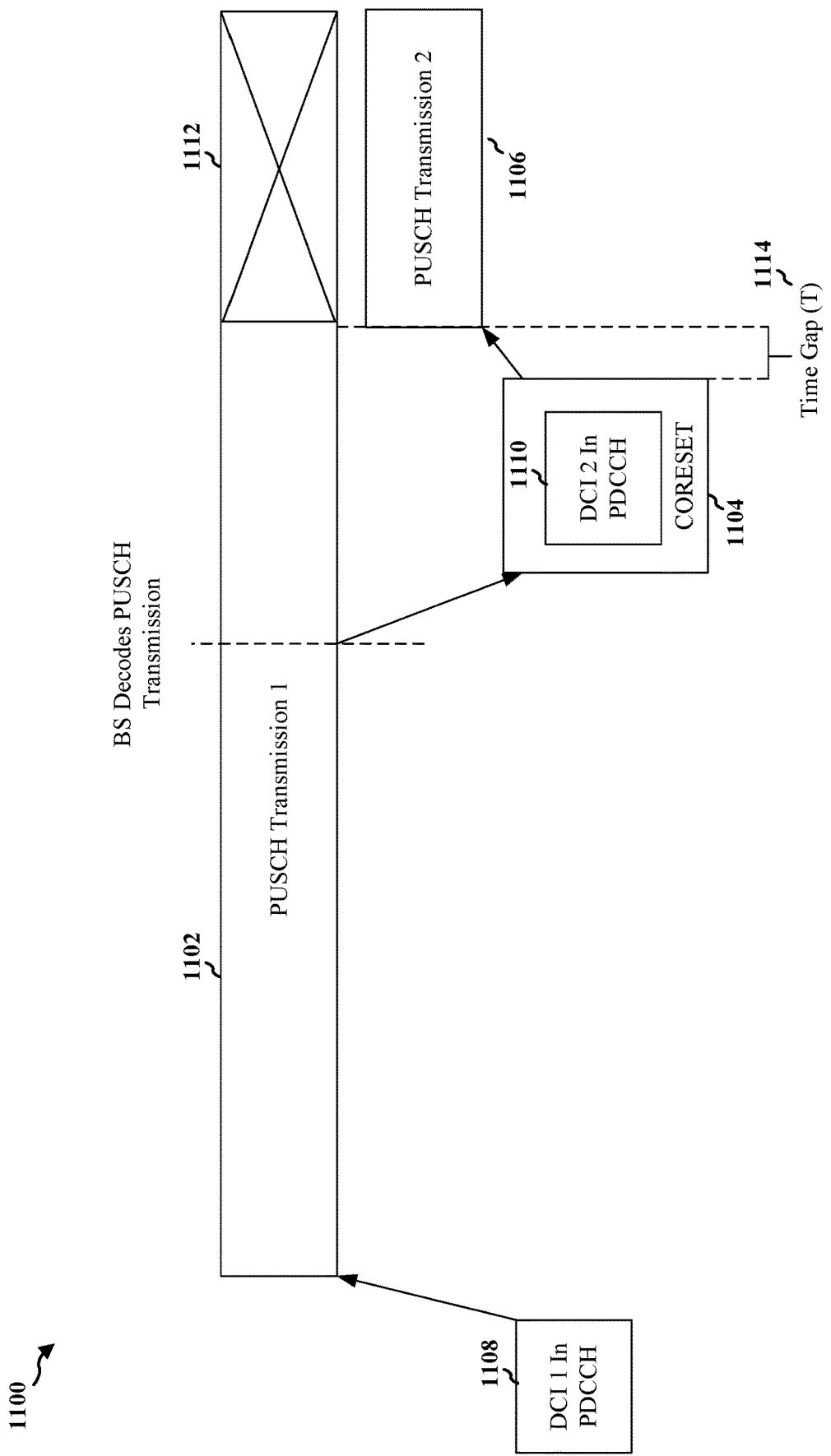
FIG. 11 is a diagram illustrating an example of a terminated, first uplink data transmission in response to downlink information in a CORESET implicitly indicating successful decoding of the first transmission and scheduling a second uplink data transmission.

FIG. 11 illustrates an example 1100 in which the UE terminates a first PUSCH transmission 1102 in response to a DCI in a CORESET 1104 (e.g., CORESET 604, 704, 804 of FIGS. 6-8) implicitly indicating successful decoding of the first PUSCH transmission and scheduling a second PUSCH transmission 1106. The base station initially provides DCI 1108 in PDCCH to the UE scheduling the first PUSCH transmission, in response to which the UE begins to transmit its uplink data to the base station in first PUSCH transmission 1102. While the UE is transmitting its uplink data in one or more repetitions, the base station may successfully decode the first PUSCH transmission. Moreover, the base station may determine that the UE has additional data to send in its transmission buffer, e.g., in response to a buffer status report from the UE or in some other manner. Therefore, the UE may provide DCI 1110 to the UE implicitly indicating that the first PUSCH transmission was successfully decoded. For example, DCI 1110 may schedule second PUSCH transmission 1106 in overlapping time resources with repetitions of first PUSCH transmission 1102. In response to receiving DCI 1110, the UE may terminate its PUSCH transmission, as represented by terminated PUSCH transmission 1112, and begin transmitting its second PUSCH transmission, after a time gap 1114 (e.g., time gap 602, 702, 802) following the CORESET 1104 including DCI 1110.

Figure 12:
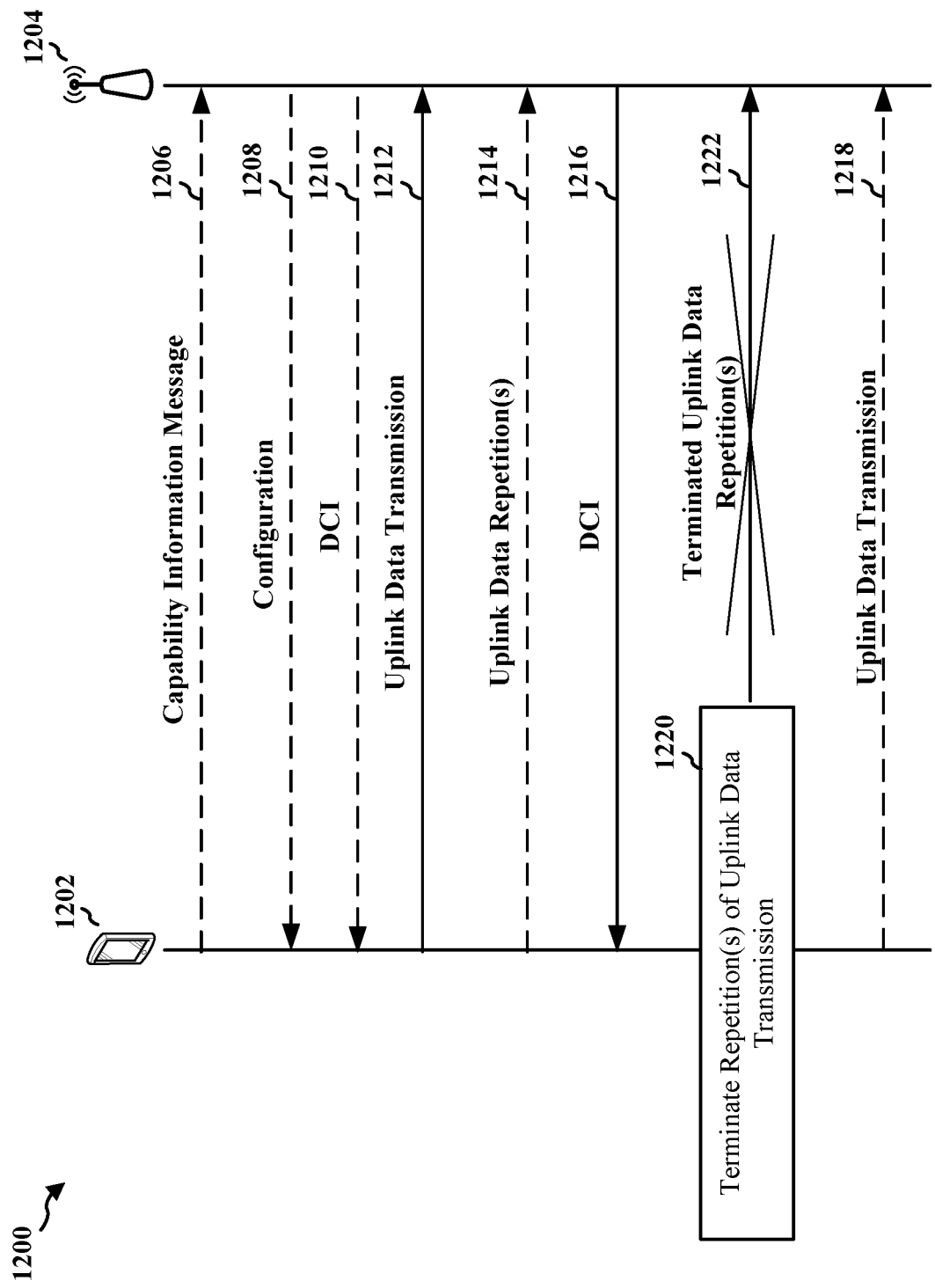
FIG. 12 is a call flow diagram between a UE and a base station.

FIG. 12 is an example 1200 of a call flow between a UE 1202 and a base station 1204. The UE may transmit a capability information message 1206 to the base station. For example, in response to receiving a capability inquiry from the base station, the UE may provide a capability information message that indicates whether the UE is capable of advanced PUSCH processing capability (e.g., PUSCH processing capability 2). The base station may provide a configuration 1208 to the UE. For example, the configuration may be a PUSCH configuration indicating a number of repetitions of uplink data which the UE may transmit on PUSCH in response to a dynamic grant. Alternatively, the configuration may be a configured grant configuration indicating a number of repetitions of uplink data that the UE may transmit on PUSCH in response to a configured grant.

Subsequently, the UE 1202 may receive a DCI 1210 from base station 1204 scheduling an uplink data transmission 1212. For example, DCI 1210 may correspond to DCI 1006 or DCI 1108 in FIG. 10 or 11, respectively. Similarly, uplink data transmission 1212 may correspond to PUSCH transmission 1002 or first PUSCH transmission 1102 in FIG. 10 or 11, respectively. The UE may then transmit uplink data transmission 1212 to the base station, including one or more repetitions 1214 of the uplink data transmission as configured by configuration 1208.

In this example, the base station 1204 successfully decodes the uplink data transmission 1212 after receiving the one or more repetitions 1214. Therefore, the base station provides a DCI 1216 to the UE 1202 explicitly or implicitly indicating that the uplink data transmission was successfully decoded. For example, DCI 1216 may correspond to DCI 1008 in CORESET 1004 of FIG. 10 if the UE does not have additional data to send in its transmission buffer. In such case, DCI 1216 may have a DCI format 0-0 or 0-1 including one or more of its parameters configured with bit values to effectively indicate a HARQ-ACK, as described above with respect to FIG. 9. Alternatively, DCI 1216 may correspond to DCI 1110 in CORESET 1104 of FIG. 11 if the UE has additional data to send in its transmission buffer. In such case, DCI 1216 may schedule subsequent uplink data transmission 1218 in overlapping time resources with the one or more repetitions 1214.

At 1220, in response to receiving DCI 1216, the UE 1202 may terminate subsequent repetition(s) of the uplink data transmission 1212. For example, if the base station 1204 configures the UE to transmit eight repetitions of uplink data transmission 1212, the base station may successfully decode the data after four repetitions (the repetitions 1214) and provide DCI 1216 to the UE prior to the next scheduled repetition. As a result, the UE may refrain from transmitting the remaining four repetitions to the base station, as represented by terminated uplink data repetitions 1222 (e.g., terminated PUSCH transmission 1010, 1112 of FIG. 10 or 11, respectively). In another example, if the base station successfully decodes the uplink data transmission 1212 before even the first configured repetition, the UE may refrain from transmitting the eight repetitions to the base station. The UE may terminate its repetitions after a time gap (e.g., time gap 602, 702, 802, 1012, 1114 of FIGS. 6-8 and 10-11) following the CORESET including the DCI 1216. The time gap, for example, may be a function of the SCS of the PDCCH carrying DCI 1210, the SCS of the PUSCH carrying uplink data transmission 1212 or repetitions 1214, the PUSCH processing capability of the UE reported in capability information message 1206, or other factors. Moreover, if DCI 1216 schedules subsequent uplink data transmission 1218 in overlapping resources with terminated uplink data repetitions 1222, the UE may transmit the subsequent uplink data transmission in the overlapping resources.

Figure 13:
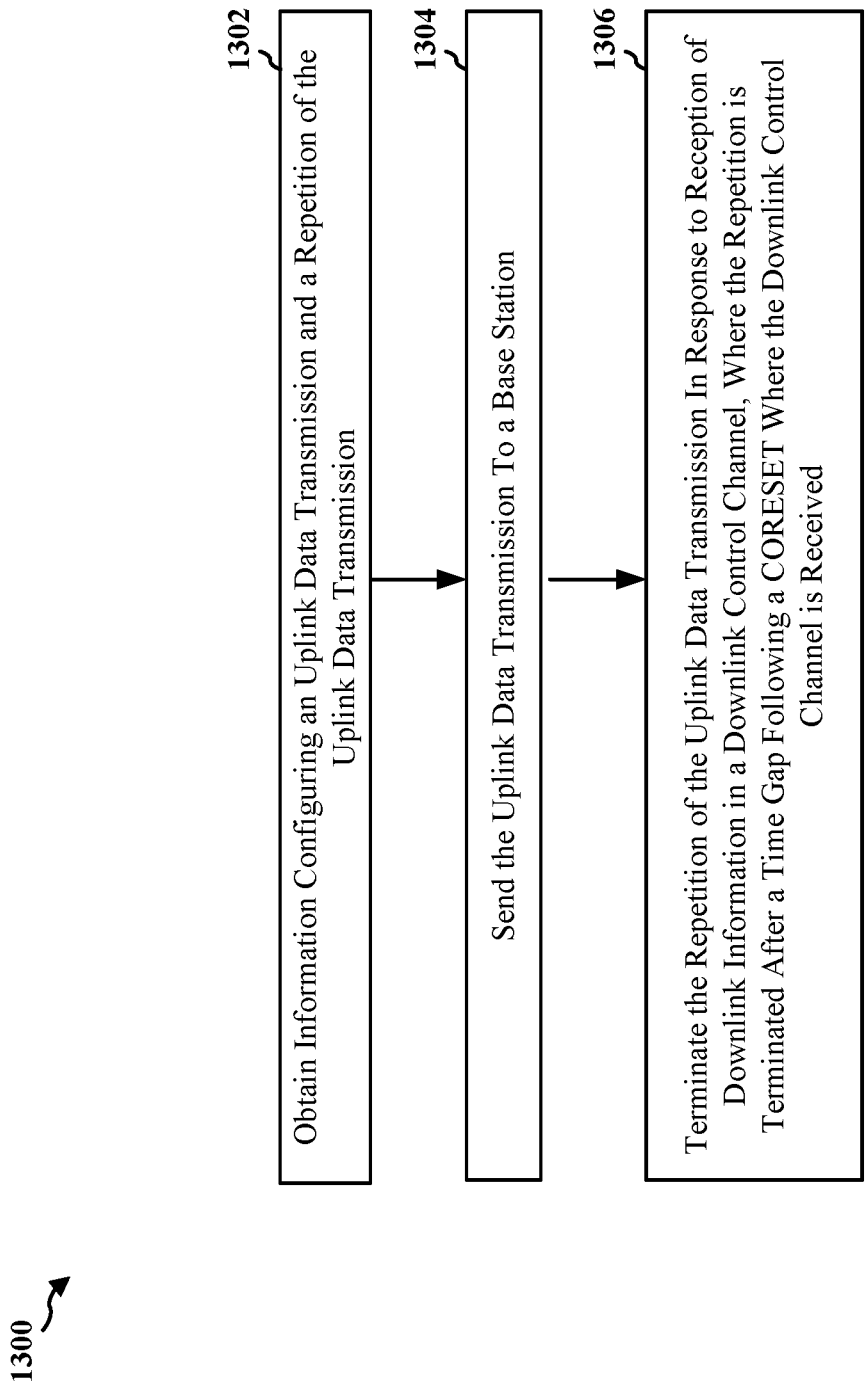
FIG. 13 is a flowchart of a method of wireless communication at a UE.

FIG. 13 is a flowchart 1300 of a method of wireless communication. The method may be performed by a UE (e.g., the UE 104, 350, 1202; the apparatus 1402). Optional aspects are illustrated in dashed lines. The method allows a UE to terminate PUSCH transmissions after a time gap following a CORESET to account for different timing considerations between NR and LTE.

At 1302, the UE obtains information configuring an uplink data transmission and a repetition of the uplink data transmission. For example, 1302 may be performed by obtain component 1440. For instance, referring to FIG. 12, the UE 1202 may obtain configuration 1208 from base station 1204 configuring uplink data transmission 1212 and repetitions 1214 of uplink data transmission 1212. For example, the configuration may be a PUSCH configuration indicating a number of repetitions of uplink data which the UE may transmit on PUSCH in response to a dynamic grant. In another example, the configuration may be a configured grant configuration indicating a number of repetitions of uplink data that the UE may transmit on PUSCH in response to a configured grant. Thus, the obtained information may be a PUSCH configuration, a configured grant configuration, or other configuration(s) for an uplink data transmission including uplink data repetitions. The information configuring the uplink data transmission and the repetition of the uplink data transmission may be the same information (e.g., a single configuration) or different information (e.g., different configurations).

At 1304, the UE sends the uplink data transmission to a base station. For example, 1304 may be performed by send component 1442. For instance, referring to FIG. 12, the UE 1202 may send uplink data transmission 1212 to base station 1204. The UE 1202 may also send one or more repetitions 1214 of the uplink data transmission. The uplink data transmission and repetitions may be scheduled by DCI 1210.

Finally, at 1306, the UE terminates the repetition of the uplink data transmission in response to reception of downlink information in a downlink control channel. For example, 1306 may be performed by termination component 1444. For instance, referring to FIG. 12, at 1220, the UE 1202 terminates or refrains from sending one or more subsequent repetitions of uplink data transmission 1212, as represented by terminated uplink data repetition(s) 1222. The UE may refrain from sending the repetition(s) in response to receiving DCI 1216 in PDCCH.

The repetition is terminated after a time gap following a CORESET where the downlink control channel is received. For instance, referring to FIGS. 6-8, and 10-12, the UE 1202 may terminate its repetitions at 1220 after a time gap (e.g., time gap 602, 702, 802, 1012, 1114) following the CORESET (e.g., CORESET 604, 704, 804, 1004, 1104) where the PDCCH carrying DCI 1216 (e.g., DCI 1008, 1110) is received.

The time gap may be equal to a length of one or more symbols following a last symbol of the CORESET. For example, referring to FIG. 6, time gap 602 may be equal to a length of 12 symbols (T=12 symbols) following last symbol 608 of CORESET 604. In another example, referring to FIG. 7, time gap 702 may be equal to a length of 13 symbols (T=13 symbols) following last symbol 708 of CORESET 704. The time gap may have different symbol lengths in other examples. Additionally, the time gap may end during a slot, and the terminating at 1306 may begin in an initial symbol of a subsequent slot. For example, referring to FIGS. 7 and 8, time gap 702, 802 may end during next slot 710, 814 (slot N+1), and the terminated PUSCH transmissions (e.g., terminated uplink data repetition(s) 1222 in FIG. 12) may begin in symbol 0 of subsequent slot 712, 816 (slot N+2).

The downlink information may indicate a HARQ-ACK. In this example, the downlink information may include a FDRA, a MCS, and other parameters, and the HARQ-ACK may be indicated by a first preconfigured bit value of the FDRA or of the MCS and a second preconfigured bit value of the other parameters. The second preconfigured bit value may be different than the first preconfigured bit value. For example, referring to FIGS. 10 and 12, the DCI 1008, 1216 may explicitly indicate that the uplink data transmission 1212 or repetition(s) 1214 was successfully decoded. For instance, DCI 1008, 1216 may have a DCI format 0-0 or 0-1 including one or more of its parameters configured with bit values to effectively indicate a HARQ-ACK, as described above with respect to FIG. 9. As an example, the FDRA 902 or MCS 904 of the DCI may be set to all ones, while the other parameters 906 of the DCI may be set to all zeroes. The base station 1204 may provide this DCI, for instance, if the UE does not have additional data to send in its transmission buffer.

The downlink information may schedule a subsequent uplink data transmission after the time gap. For example, referring to FIGS. 11 and 12, the DCI 1110, 1216 may implicitly indicate that the uplink data transmission 1212 or repetition(s) 1214 was successfully decoded. For instance, DCI 1216 may schedule subsequent uplink data transmission 1218 in overlapping time resources with the one or more repetitions 1214 after time gap 602, 702, 802, 1114. Moreover, the time gap may end during a slot, and the subsequent uplink data transmission may begin in an initial symbol of a subsequent slot. For example, referring to FIG. 8, time gap 802 may end during next slot 814 (slot N+1), and the subsequent PUSCH transmission (e.g., subsequent uplink data transmission 1218 in FIG. 12) may begin in symbol 0 of subsequent slot 816 (slot N+2).

The time gap may be a function of a first SCS of a PDCCH carrying the downlink information and a second SCS of a PUSCH carrying the uplink data transmission. For example, referring to FIGS. 6-8 and 10-12, the time gap 602, 702, 802, 1012, 1114 (T) may be a function of a subcarrier spacing of the PDCCH carrying the DCI 1008, 1110, 1216 and a subcarrier spacing of the PUSCH carrying the uplink data transmission 1212 or repetition(s) 1214. For example, T may be one value if the SCS of the DCI and the PUSCH transmission are both 15 kHz, T may be another value if the SCS of the DCI and the PUSCH transmission are both 30 kHz, T may be another value if the SCS of the DCI is 15 kHz and the SCS of the PUSCH transmission is 30 kHz, etc.

The time gap may be a function of a first SCS of a downlink BWP including a PDCCH and a second SCS of an uplink BWP including a PUSCH. For example, referring to FIGS. 6-8 and 10-12, the time gap 602, 702, 802, 1012, 1114 (T) may be a function of a subcarrier spacing of an active DL BWP over which the PDCCH carrying the DCI 1008, 1110, 1216 is monitored and a subcarrier spacing of an active UL BWP over which the PUSCH carrying the uplink data transmission 1212 or repetition(s) 1214 is transmitted. For example, T may be one value if the SCS of the DL BWP carrying the DCI and the UL BWP carrying the PUSCH transmission are both 15 kHz, T may be another value if the SCS of the DL BWP and the UL BWP are both 30 kHz, T may be another value if the SCS of the DL ZWP is 15 kHz and the SCS of the UL BWP is 30 kHz, etc.

The time gap may be a function of a UE PUSCH processing capability. For example, referring to FIGS. 6-8 and 10-12, the time gap 602, 702, 802, 1012, 1114 (T) may be a function of a PUSCH processing capability of the UE. For example, T may be one value for UE PUSCH processing capability 1 and another value for UE PUSCH processing capability 2. The PUSCH processing capability of the UE may be indicated, for example, in capability information message 1206 of FIG. 12.

The time gap may be a function of a configuration indicating whether a first symbol of the uplink data transmission is reserved for a DMRS. For example, referring to FIGS. 6-8 and 10-12, the time gap 602, 702, 802, 1012, 1114 (T) may be a function of a configuration (e.g., configuration 1208 or a different configuration) indicating whether a first symbol of a PUSCH allocation for the uplink data transmission 1212 or repetition(s) 1214 consists only of DMRS. For example, T may be one value if the base station configures the first symbol of a slot of the PUSCH transmission to include only DMRS, while T may be another value if the base station configures the first symbol of a slot of the PUSCH transmission to include only PUSCH data, or PUSCH data and DMRS.

The time gap may be a function of a PUSCH preparation time. For example, referring to FIGS. 6-8 and 10-12, the time gap 602, 702, 802, 1012, 1114 (T) may be a function of a UE PUSCH preparation time $T_{proc,2}$, where $T_{proc,2}$ is a function of PUSCH preparation time $N_2$, where $N_2$ is based on a numerology µ for UE processing capability 1, where p corresponds to the one of ($\mu_{DL}$, $\mu_{DL}$) resulting with the largest $T_{proc,2}$ (the smaller value or SCS between $\mu_{DL}$, $\mu_{UL}$), where the $\mu_{DL}$ corresponds to the subcarrier spacing at with the PDCCH carrying the DCI scheduling the PUSCH was transmitted, and where $\mu_{UL}$ corresponds to the subcarrier spacing at which the PUSCH is to be transmitted. For instance, the value of T may be different for different values of $N_2$.

The time gap may comprise a plurality of separately configurable portions. For instance, referring to FIG. 8, time gap 802 may include multiple portions, including a first time gap portion 810 (T symbols) and a second time gap portion 812 (Δ symbols) which the base station may separately configure. One of the separately configurable portions (e.g., second time gap portion 812) may be pre-configured (e.g., fixed), indicated in a PUSCH configuration (e.g., configuration 1208 or a different configuration), or dependent on UE capability. For instance, in one example, the value of Δ may be fixed to a value of 0, 1, 2 or some other number. In another example, the base station may dynamically indicate the value of Δ to the UE within a PUSCH configuration (e.g., 0, 1, 2 or some other number of symbols). In a further example, the value of Δ may be dependent on UE capability. For instance, Δ may be one value if the UE is capable of PUSCH processing capability 2, while Δ may be another value if the UE is only capable of PUSCH processing capability 1.

Additionally, one of the separately configurable portions (e.g., second time gap portion 812) may be a function of a first SCS of a PDCCH carrying the downlink information and a second SCS of a PUSCH carrying the uplink data transmission. For example, the duration of A may be a function of the SCS of the PDCCH carrying the DCI 1216 and the SCS of the PUSCH carrying the uplink data transmission 1212 or repetition(s) 1214 (e.g., the smaller SCS between the PDCCH SCS and the PUSCH SCS). For instance, the total length in time of A may be one value if the smaller SCS is 15 kHz, the total length in time of A may be another value if the smaller SCS is 30 kHz, etc.

Figure 14:
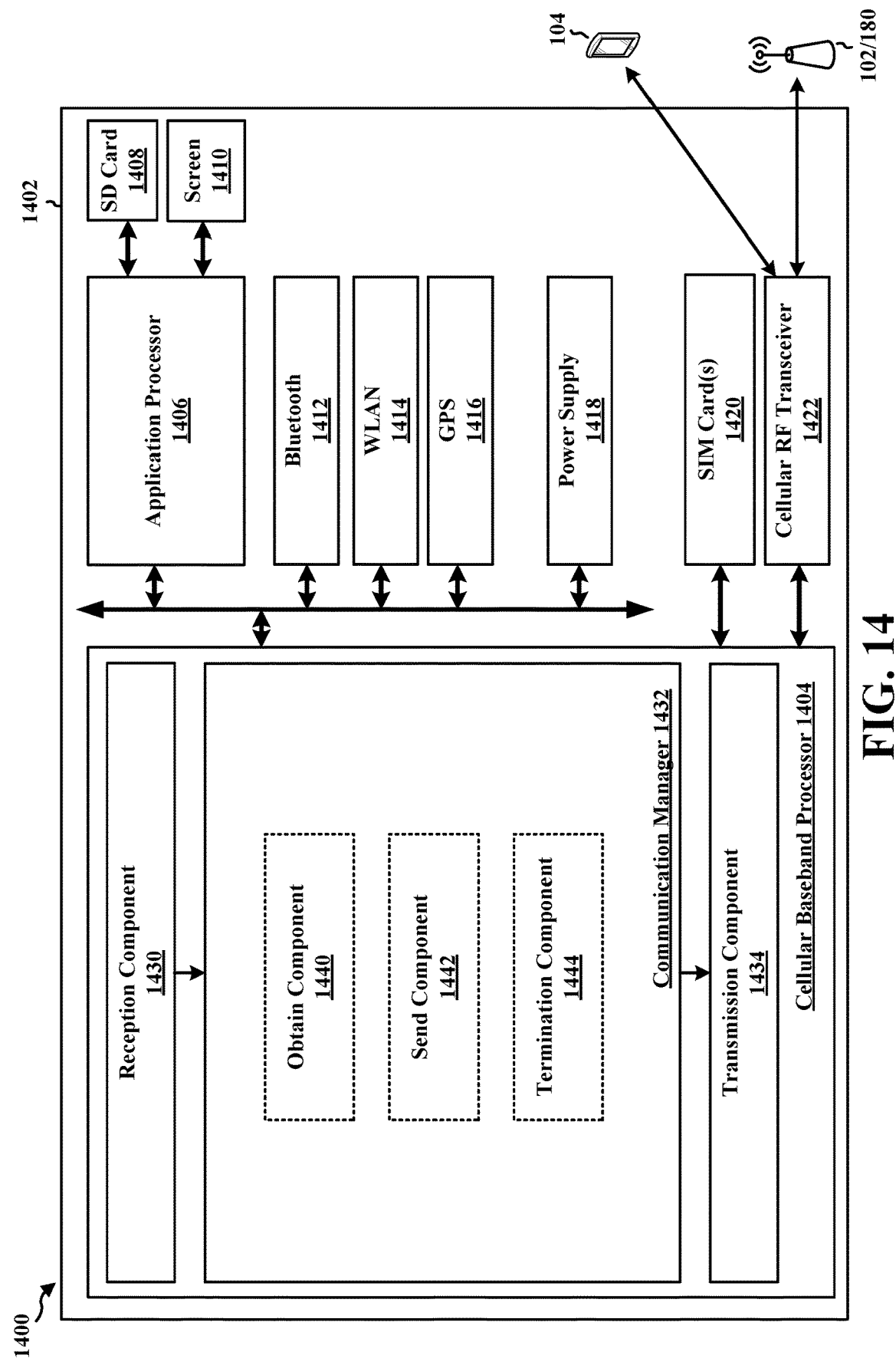
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes an obtain component 1440 that is configured to obtain information configuring an uplink data transmission and a repetition of the uplink data transmission, e.g., as described in connection with 1302. FIG. 15A illustrates an example 1500 of a process or algorithm performed by obtain component 1440. The obtain component may be implemented, for example, in RX processor 356. At 1502, the obtain component 1440 receives the information. For example, referring to FIG. 3, the obtain component 1440 may receive a signal carrying the information from base station 310 through one or more respective antennas 352. Then, at 1504, the obtain component 1440 decodes the received information. For example, referring to FIG. 3, the obtain component may demodulate the received information based on a modulation scheme (e.g., BPSK, QPSK, M-PSK, M-QAM, etc.).

The communication manager 1432 further includes a send component 1442 that receives input in the form of the information from the obtain component 1440 and is configured to send the uplink data transmission to a base station, e.g., as described in connection with 1304. FIG. 15B illustrates an example 1520 of a process or algorithm performed by send component 1442. The send component may be implemented, for example, in TX processor 368. At 1522, the send component 1442 encodes uplink data. For example, referring to FIG. 3, the send component 1442 may modulate uplink data based on a modulation scheme (e.g., BPSK, QPSK, M-PSK, M-QAM, etc.). Then, at 1524, the send component 1442 transmits the encoded uplink data. For example, referring to FIG. 3, the send component may transmit the encoded uplink data to base station 310 through one or more respective antennas 352.

The communication manager 1432 further includes a termination component 1444 that receives input in the form of the information from the obtain component 1440 and is configured to terminate the repetition of the uplink data transmission in response to reception of downlink information in a downlink control channel, e.g., as described in connection with 1306. FIG. 15C illustrates an example 1540 of a process or algorithm performed by termination component 1444. The termination component may be implemented, for example, in controller/processor 359. At 1542, the termination component 1444 receives the downlink information. For example, referring to FIG. 3, the termination component 1444 may receive a DCI from the RX processor 356 (or the obtain component 1440 of RX processor 356). For instance, the obtain component 1440 in RX processor 356 may receive a signal carrying a PDCCH payload including DCI from base station 310 through one or more respective antennas 352, demodulate the PDCCH payload based on a modulation scheme (e.g., BPSK, QPSK, M-PSK, M-QAM, etc.), and provide the demodulated PDCCH payload including the DCI to the termination component 1444 in controller/processor 359. The termination component 1444 may then decode the demodulated PDCCH payload to receive the DCI. Then, at 1544, the termination component 1444 refrains from transmitting the repetition in response to the received downlink information. For example, referring to FIG. 3, the termination component 1444 may stop delivery of uplink data repetitions to the TX processor 368 (or the send component 1442 of the TX processor).

The apparatus may include additional components that perform each of the blocks of the algorithm in the aforementioned flowcharts of FIGS. 13 and 15A-C. As such, each block in the aforementioned flowcharts of FIGS. 13 and 15A-C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for obtaining information configuring an uplink data transmission and a repetition of the uplink data transmission, means for sending the uplink data transmission to a base station, and means for terminating the repetition of the uplink data transmission in response to reception of downlink information in a downlink control channel. The repetition is terminated after a time gap following a CORESET where the downlink control channel is received.

In one configuration, the time gap may be equal to a length of one or more symbols following a last symbol of the CORESET.

In one configuration, the time gap may end during a slot, and the terminating may begin in an initial symbol of a subsequent slot.

In one configuration, the downlink information may indicate a HARQ-ACK. In one configuration, the downlink information may include a FDRA, a MCS, and other parameters, and the HARQ-ACK may be indicated by a first preconfigured bit value of the FDRA or of the MCS and a second preconfigured bit value of the other parameters, the second preconfigured bit value being different than the first preconfigured bit value.

In one configuration, the downlink information may schedule a subsequent uplink data transmission after the time gap. In one configuration, the time gap may end during a slot, and the subsequent uplink data transmission may begin in an initial symbol of a subsequent slot.

In one configuration, the time gap may be a function of a first SCS of a PDCCH carrying the downlink information and a second SCS of a PUSCH carrying the uplink data transmission.

In one configuration, the time gap may be a function of a first SCS of a downlink BWP including a PDCCH and a second SCS of an uplink BWP including a PUSCH.

In one configuration, the time gap may be a function of a UE PUSCH processing capability.

In one configuration, the time gap may be a function of a configuration indicating whether a first symbol of the uplink data transmission is reserved for a DMRS.

In one configuration, the time gap may be a function of a PUSCH preparation time.

In one configuration, the time gap may comprise a plurality of separately configurable portions. In one configuration, one of the separately configurable portions is preconfigured, indicated in a PUSCH configuration, or dependent on UE capability. In one configuration, one of the separately configurable portions may be a function of a first SCS of a PDCCH carrying the downlink information and a second SCS of a PUSCH carrying the uplink data transmission.

The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

If a base station has already decoded uplink data in a prior PUSCH transmission or repetition, the UE may continue to send unnecessary PUSCH repetitions due to a conventional lack of HARQ feedback for PUSCH in NR. As a result, the UE may waste transmission power and PUSCH resources on inefficient repetitions. To address this waste of power and inefficiency, the base station may provide a DCI to the UE which explicitly or implicitly indicates whether a prior PUSCH transmission was successfully decoded, and the UE may perform early termination of an ongoing PUSCH transmission (e.g., terminate inefficient repetitions). Thus, UE power reduction and enhanced resource efficiency may be achieved. Moreover, the UE may terminate PUSCH transmissions after a time gap (T symbols) following a CORESET including the PDCCH carrying the DCI, rather than after a number of subframes (k subframes) following a subframe containing the DCI. The time gap may be a function of various parameters, such as PDCCH SCS (or DL BWP SCS), PUSCH SCS (or UL BWP SCS), UE PUSCH processing capability, DMRS configuration, or PUSCH preparation time. Such configurable timing may accommodate and minimize conflicts with various timing configurations present in NR (e.g., dynamic TDD, different numerologies between PDCCH and PUSCH, and multiple PUSCH processing capabilities). Additionally, the time gap may be divided into separately configurable portions, where one of the portions may also be a function of PDCCH SCS and PUSCH SCS. Such configured portions may provide additional UE processing margin for low capability UEs while similarly accounting for the various timing configurations present in NR as described above.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: obtaining information configuring an uplink data transmission and a repetition of the uplink data transmission; sending the uplink data transmission to a base station; and terminating the repetition of the uplink data transmission in response to reception of downlink information in a downlink control channel, wherein the repetition is terminated after a time gap following a control resource set (CORESET) where the downlink control channel is received.

Example 2 is the method of Example 1, wherein the time gap is equal to a length of one or more symbols following a last symbol of the CORESET.

Example 3 is the method of any of Examples 1 and 2, wherein the time gap ends during a slot, and the terminating begins in an initial symbol of a subsequent slot.

Example 4 is the method of any of Examples 1 to 3, wherein the downlink information indicates a hybrid automatic repeat request (HARD) acknowledgment (HARQ-ACK).

Example 5 is the method of Example 4, wherein the downlink information includes a frequency domain resource assignment (FDRA), a modulation and coding scheme (MCS), and other parameters, and the HARQ-ACK is indicated by a first preconfigured bit value of the FDRA or of the MCS and a second preconfigured bit value of the other parameters, the second preconfigured bit value being different than the first preconfigured bit value.

Example 6 is the method of any of Examples 1 to 3, wherein the downlink information schedules a subsequent uplink data transmission after the time gap.

Example 7 is the method of Example 6, wherein the time gap ends during a slot, and the subsequent uplink data transmission begins in an initial symbol of a subsequent slot.

Example 8 is the method of any of Examples 1 to 7, wherein the time gap is a function of a first subcarrier spacing (SCS) of a physical downlink control channel (PDCCH) carrying the downlink information and a second SCS of a physical uplink shared channel (PUSCH) carrying the uplink data transmission.

Example 9 is the method of any of Examples 1 to 8, wherein the time gap is a function of a first subcarrier spacing (SCS) of a downlink bandwidth part (BWP) including a physical downlink control channel (PDCCH) and a second SCS of an uplink BWP including a physical uplink shared channel (PUSCH).

Example 10 is the method of any of Examples 1 to 9, wherein the time gap is a function of a UE physical uplink shared channel (PUSCH) processing capability.

Example 11 is the method of any of Examples 1 to 10, wherein the time gap is a function of a configuration indicating whether a first symbol of the uplink data transmission is reserved for a demodulation reference signal (DMRS).

Example 12 is the method of any of Examples 1 to 11, wherein the time gap is a function of a physical uplink shared channel (PUSCH) preparation time.

Example 13 is the method of any of Examples 1 to 12, wherein the time gap comprises a plurality of separately configurable portions.

Example 14 is the method of Example 13, wherein one of the separately configurable portions is pre-configured, indicated in a physical uplink shared channel (PUSCH) configuration, or dependent on UE capability.

Example 15 is the method of Example 13 or 14, wherein one of the separately configurable portions is a function of a first subcarrier spacing (SCS) of a physical downlink control channel (PDCCH) carrying the downlink information and a second SCS of a physical uplink shared channel (PUSCH) carrying the uplink data transmission.

Example 16 is an apparatus for wireless communication, comprising: a processor; memory coupled with the processor; and instructions stored in the memory and operable, when executed by the processor, to cause the apparatus to: obtain information configuring an uplink data transmission and a repetition of the uplink data transmission; send the uplink data transmission to a base station; and terminate the repetition of the uplink data transmission in response to reception of downlink information in a downlink control channel, wherein the repetition is terminated after a time gap following a control resource set (CORESET) where the downlink control channel is received.

Example 17 is the apparatus of Example 16, wherein the time gap is equal to a length of one or more symbols following a last symbol of the CORESET.

Example 18 is the apparatus of any of Examples 16 and 17, wherein the downlink information indicates a hybrid automatic repeat request (HARD) acknowledgment (HARQ-ACK).

Example 19 is the apparatus of any of Examples 16 and 17, wherein the downlink information schedules a subsequent uplink data transmission after the time gap.

Example 20 is the apparatus of any of Examples 16 to 19, wherein the time gap is a function of a first subcarrier spacing (SCS) of a physical downlink control channel (PDCCH) carrying the downlink information and a second SCS of a physical uplink shared channel (PUSCH) carrying the uplink data transmission.

Example 21 is the apparatus of any of Examples 16 to 20, wherein the time gap is a function of a first subcarrier spacing (SCS) of a downlink bandwidth part (BWP) including a physical downlink control channel (PDCCH) and a second SCS of an uplink BWP including a physical uplink shared channel (PUSCH).

Example 22 is the apparatus of any of Examples 16 to 21, wherein the time gap is a function of a UE physical uplink shared channel (PUSCH) processing capability.

Example 23 is the apparatus of any of Examples 16 to 22, wherein the time gap is a function of a configuration indicating whether a first symbol of the uplink data transmission is reserved for a demodulation reference signal (DMRS).

Example 24 is the apparatus of any of Examples 16 to 23, wherein the time gap is a function of a physical uplink shared channel (PUSCH) preparation time.

Example 25 is the apparatus of any of Examples 16 to 24, wherein the time gap comprises a plurality of separately configurable portions.

Example 26 is the apparatus of Example 25, wherein one of the separately configurable portions is a function of a first subcarrier spacing (SCS) of a physical downlink control channel (PDCCH) carrying the downlink information and a second SCS of a physical uplink shared channel (PUSCH) carrying the uplink data transmission.

Example 27 is an apparatus for wireless communication, comprising: means for obtaining information configuring an uplink data transmission and a repetition of the uplink data transmission; means for sending the uplink data transmission to a base station; and means for terminating the repetition of the uplink data transmission in response to reception of downlink information in a downlink control channel, wherein the repetition is terminated after a time gap following a control resource set (CORESET) where the downlink control channel is received.

Example 28 is the apparatus of Example 27, wherein the downlink information indicates a hybrid automatic repeat request (HARQ) acknowledgment (HARQ-ACK).

Example 29 is the apparatus of Example 27, wherein the downlink information schedules a subsequent uplink data transmission after the time gap.

Example 30 is a computer-readable medium storing computer executable code, the code when executed by a processor cause the processor to: obtain information configuring an uplink data transmission and a repetition of the uplink data transmission; send the uplink data transmission to a base station; and terminate the repetition of the uplink data transmission in response to reception of downlink information in a downlink control channel, wherein the repetition is terminated after a time gap following a control resource set (CORESET) where the downlink control channel is received.

What is claimed is:

1. A non-transitory computer-readable medium storing computer executable code, the code when executed by a processor cause the processor to:
   obtain configuration information configuring an uplink data transmission and a repetition of the uplink data transmission;
   send the uplink data transmission to a base station; and
   terminate the repetition of the uplink data transmission in response to reception of downlink information in a downlink control channel,
   wherein the repetition is terminated after a time gap following a control resource set (CORESET) where the downlink control channel is received,
   wherein the downlink information indicates a hybrid automatic repeat request (HARQ) acknowledgment (HARQ-ACK), and
   wherein the downlink information includes a frequency domain resource assignment (FDRA), a modulation and coding scheme (MCS), and other parameters, and the HARQ-ACK is indicated by a first preconfigured bit value of the FDRA or of the MCS and a second preconfigured bit value of the other parameters, the second preconfigured bit value being different than the first preconfigured bit value.

2. The method of claim 1, wherein the time gap is equal to a length of one or more symbols following a last symbol of the CORESET.

3. The method of claim 1, wherein the time gap ends during a slot, and the terminating begins in an initial symbol of a subsequent slot.

4. The method of claim 1, wherein the downlink information schedules a subsequent uplink data transmission after the time gap.

5. The method of claim 4, wherein the time gap ends during a slot, and the subsequent uplink data transmission begins in an initial symbol of a subsequent slot.

6. The method of claim 1, wherein the time gap is a function of a first subcarrier spacing (SCS) of a physical downlink control channel (PDCCH) carrying the downlink information and a second SCS of a physical uplink shared channel (PUSCH) carrying the uplink data transmission.

7. The method of claim 1, wherein the time gap is a function of a first subcarrier spacing (SCS) of a downlink bandwidth part (BWP) including a physical downlink control channel (PDCCH) and a second SCS of an uplink BWP including a physical uplink shared channel (PUSCH).

8. The method of claim 1, wherein the time gap is a function of a UE physical uplink shared channel (PUSCH) processing capability.

9. The method of claim 1, wherein the time gap is a function of a configuration indicating whether a first symbol of the uplink data transmission is reserved for a demodulation reference signal (DMRS).

10. The method of claim 1, wherein the time gap is a function of a physical uplink shared channel (PUSCH) preparation time.

11. The method of claim 1, wherein the time gap comprises a plurality of separately configurable portions.

12. The method of claim 11, wherein one of the separately configurable portions is pre-configured, indicated in a physical uplink shared channel (PUSCH) configuration, or dependent on UE capability.

13. The method of claim 11, wherein one of the separately configurable portions is a function of a first subcarrier spacing (SCS) of a physical downlink control channel (PDCCH) carrying the downlink information and a second SCS of a physical uplink shared channel (PUSCH) carrying the uplink data transmission.

14. An apparatus for wireless communication, comprising:
   a processor;
   memory coupled with the processor; and
   instructions stored in the memory and operable, when executed by the processor, to cause the apparatus to:
   obtain configuration information configuring an uplink data transmission and a repetition of the uplink data transmission;
   send the uplink data transmission to a base station; and
   terminate the repetition of the uplink data transmission in response to reception of downlink information in a downlink control channel,
   wherein the repetition is terminated after a time gap following a control resource set (CORESET) where the downlink control channel is received,
   wherein the downlink information indicates a hybrid automatic repeat request (HARQ) acknowledgment (HARQ-ACK), and wherein the downlink information includes a frequency domain resource assignment (FDRA), a modulation and coding scheme (MCS), and other parameters, and the HARQ-ACK is indicated by a first preconfigured bit value of the FDRA or of the MCS and a second preconfigured bit value of the other parameters, the second preconfigured bit value being different than the first preconfigured bit value.

15. The apparatus of claim 14, wherein the time gap is equal to a length of one or more symbols following a last symbol of the CORESET.

16. The apparatus of claim 14, wherein the downlink information schedules a subsequent uplink data transmission after the time gap.

17. The apparatus of claim 14, wherein the time gap is a function of a first subcarrier spacing (SCS) of a physical downlink control channel (PDCCH) carrying the downlink information and a second SCS of a physical uplink shared channel (PUSCH) carrying the uplink data transmission.

18. The apparatus of claim 14, wherein the time gap is a function of a first subcarrier spacing (SCS) of a downlink bandwidth part (BWP) including a physical downlink control channel (PDCCH) and a second SCS of an uplink BWP including a physical uplink shared channel (PUSCH).

19. The apparatus of claim 14, wherein the time gap is a function of a UE physical uplink shared channel (PUSCH) processing capability.

20. The apparatus of claim 14, wherein the time gap is a function of a configuration indicating whether a first symbol of the uplink data transmission is reserved for a demodulation reference signal (DMRS).

21. The apparatus of claim 14, wherein the time gap is a function of a physical uplink shared channel (PUSCH) preparation time.

22. The apparatus of claim 14, wherein the time gap comprises a plurality of separately configurable portions.

23. The apparatus of claim 22, wherein one of the separately configurable portions is a function of a first subcarrier spacing (SCS) of a physical downlink control channel (PDCCH) carrying the downlink information and a second SCS of a physical uplink shared channel (PUSCH) carrying the uplink data transmission.

24. An apparatus for wireless communication, comprising:
   means for obtaining configuration information configuring an uplink data transmission and a repetition of the uplink data transmission;
   means for sending the uplink data transmission to a base station; and
   means for terminating the repetition of the uplink data transmission in response to reception of downlink information in a downlink control channel,
   wherein the repetition is terminated after a time gap following a control resource set (CORESET) where the downlink control channel is received,
   wherein the downlink information indicates a hybrid automatic repeat request (HARQ) acknowledgment (HARQ-ACK), and wherein the downlink information includes a frequency domain resource assignment (FDRA), a modulation and coding scheme (MCS), and other parameters, and the HARQ-ACK is indicated by a first preconfigured bit value of the FDRA or of the MCS and a second preconfigured bit value of the other parameters, the second preconfigured bit value being different than the first preconfigured bit value.

25. The apparatus of claim 24, wherein the downlink information schedules a subsequent uplink data transmission after the time gap.

26. A non-transitory computer-readable medium storing computer executable code, the code when executed by a processor cause the processor to:
   obtain configuration information configuring an uplink data transmission and a repetition of the uplink data transmission;
   send the uplink data transmission to a base station; and
   terminate the repetition of the uplink data transmission in response to reception of downlink information in a downlink control channel,
   wherein the repetition is terminated after a time gap following a control resource set (CORESET) where the downlink control channel is received,
   wherein the downlink information indicates a hybrid automatic repeat request (HARQ) acknowledgment (HARQ-ACK), and wherein the downlink information includes a frequency domain resource assignment (FDRA), a modulation and coding scheme (MCS), and other parameters, and the HARQ-ACK is indicated by a first preconfigured bit value of the FDRA or of the MCS and a second preconfigured bit value of the other parameters, the second preconfigured bit value being different than the first preconfigured bit value.

* * * * *